(12) United States Patent
Nichols

(10) Patent No.: US 7,116,269 B2
(45) Date of Patent: Oct. 3, 2006

(54) RADIO AND LIGHT BASED THREE DIMENSIONAL POSITIONING SYSTEM

(75) Inventor: Mark E. Nichols, Christchurch (NZ)

(73) Assignee: Trimble Navigation, LTD, Sunnyvale, CA (US)

( * ) Notice: Subject to any disclaimer, the term of this patent is extended or adjusted under 35 U.S.C. 154(b) by 18 days.

(21) Appl. No.: 11/059,167

(22) Filed: Feb. 15, 2005

(65) Prior Publication Data
US 2006/0181454 A1 Aug. 17, 2006

(51) Int. Cl.
G01S 5/10 (2006.01)

(52) U.S. Cl. ............. 342/357.08; 342/357.03; 342/357.09

(58) Field of Classification Search ........... 342/357.01, 342/357.03, 357.06, 357.08, 357.09; 701/213, 701/215; 356/141.1, 141.3, 141.4
See application file for complete search history.

(56) References Cited

U.S. PATENT DOCUMENTS 5,600,436 A * 2/1997 Gudat ............. 356/141.3
5,982,480 A * 11/1999 Itzkovich et al. ........ 356/141.1
6,400,452 B1 * 6/2002 Maynard .............. 356/141.1
6,433,866 B1   8/2002 Nichols

* cited by examiner

Primary Examiner—Dao Phan
(74) Attorney, Agent, or Firm—Boris G. Tankhilevich

(57) ABSTRACT

A radio and light based 3-D positioning system comprising: a stationary integrated self-positioning radio transceiver/laser transmitter (RTR_LT) configured to receive a first plurality of external radio signals, configured to determine its position coordinates based on the first plurality of received external radio signals, configured to broadcast at least one internal radio signal; and configured to broadcast at least one laser beam; and at least one mobile integrated radio receiver/laser detector (RR_LD) configured to receive a second plurality of external radio signals, configured to receive at least one internal radio signal broadcasted by the stationary integrated self-positioning RTR_LT, configured to detect at least one laser beam generated by the self-positioning integrated RTR_LT; and configured to determine its 3-D position coordinates based on a set of data selected from the group consisting of: {the second plurality of received external radio signals; at least one received internal radio signal; and at least one detected laser beam}.

49 Claims, 3 Drawing Sheets

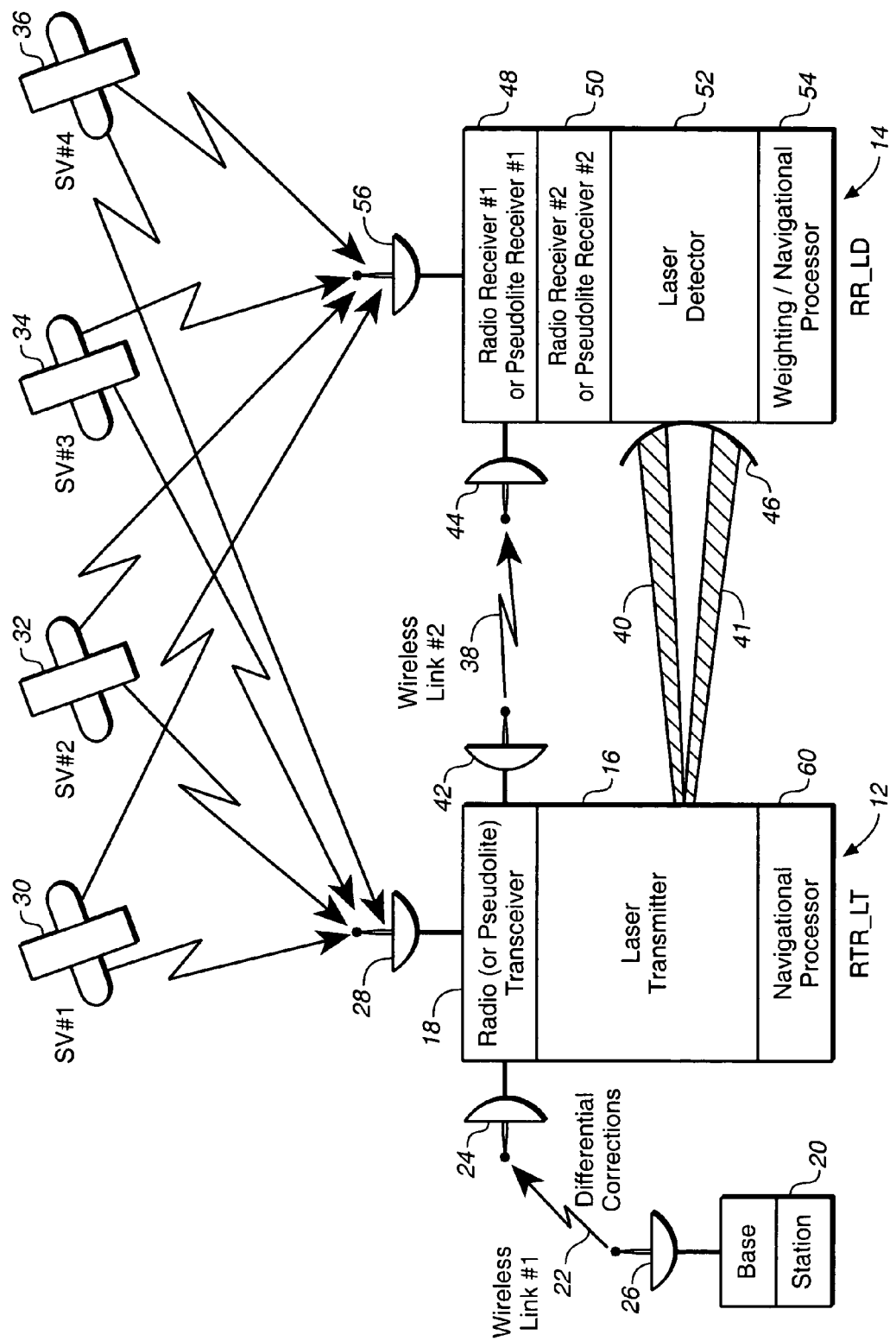
FIG._1

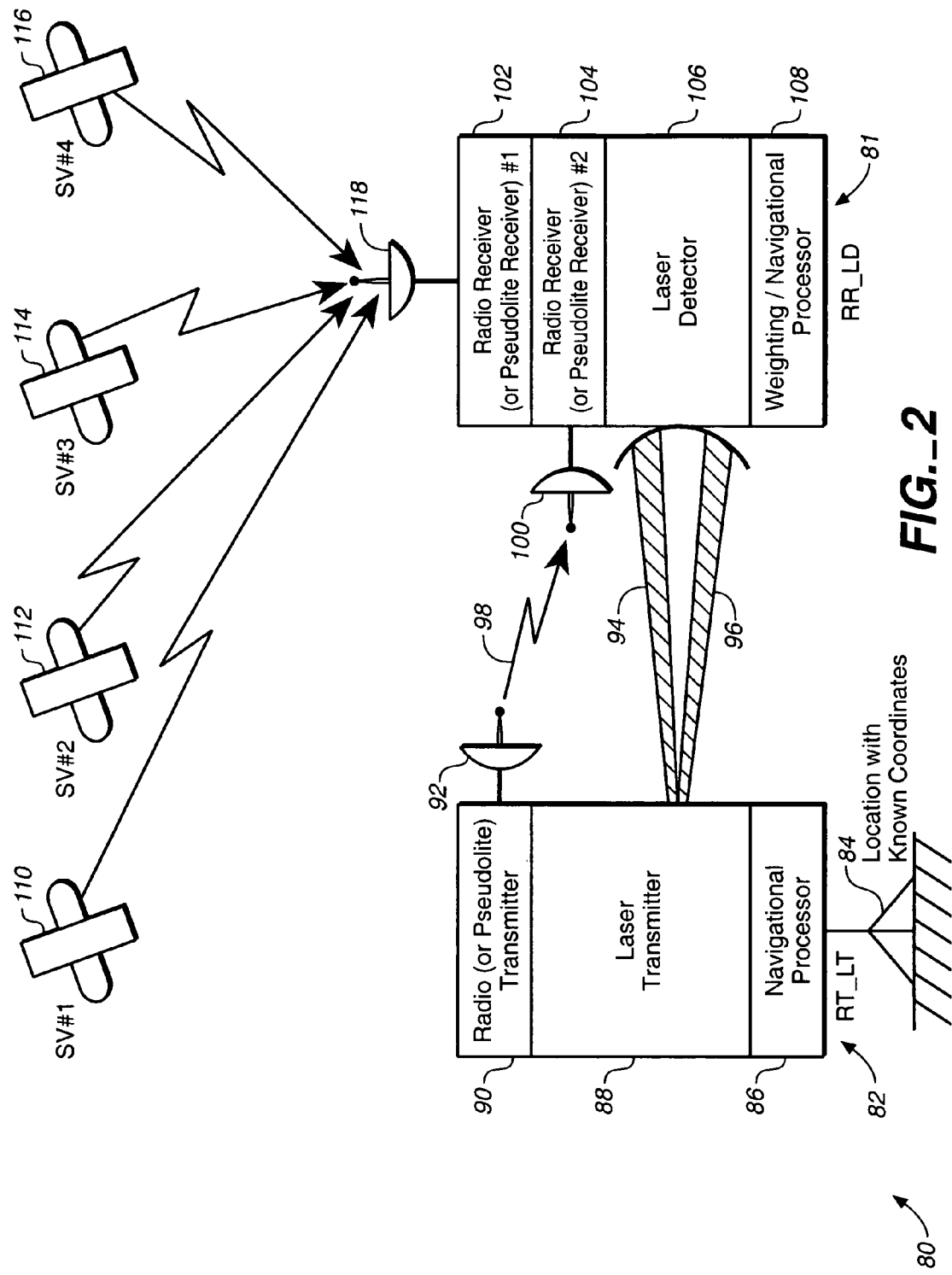
FIG._2

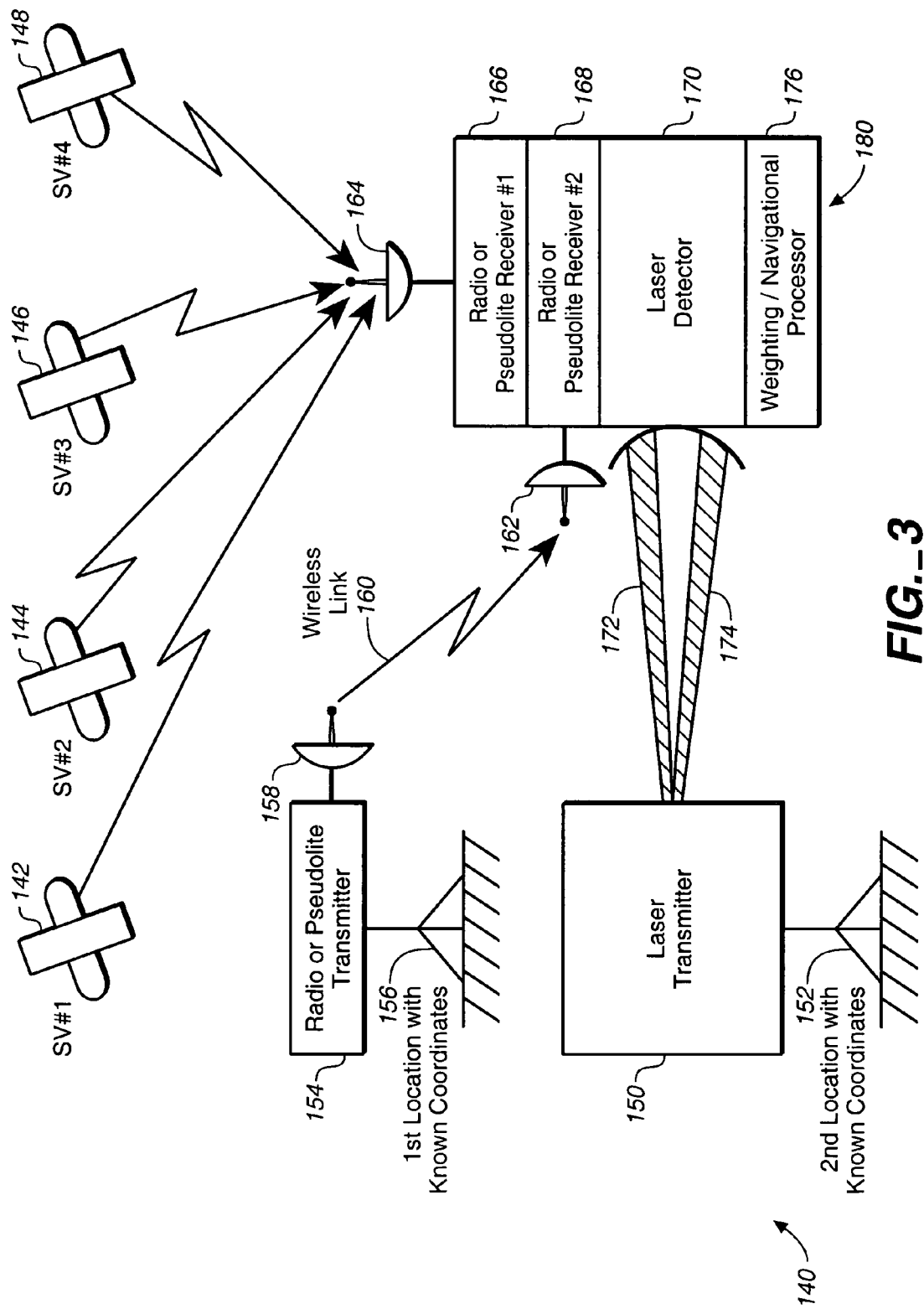
FIG._3

RADIO AND LIGHT BASED THREE DIMENSIONAL POSITIONING SYSTEM

BACKGROUND OF THE INVENTION

1. Field of the Invention

The current invention relates to position tracking and machine control systems, and, more specifically, to a combination of laser systems and radio positioning systems configured to complement each other in order to optimize the tracking and machine control capabilities of prior art systems.

2. Discussion of the Prior Art

In recent times there have been advances in the area of radio ranging or pseudolite systems. A pseudolite is a ground based radio transmitter that works in the GPS band and transmits signals similar to the GPS system. Because of limitations on using the L band for non-military purposes a new form of "pseudolite" is being developed that uses alternative frequencies such as the 2.4 GHz license free band.

In recent times there have been also advances in rotating laser systems including plane lasers and fan laser systems. Plane lasers provide a reference plane of light. Fan lasers provide one or more planes of light that are rotated about an axis, from which a difference in elevation can be derived. The common technique for deriving the difference in elevation is by determining the difference in time between detection of two or more fan beams. These systems, such as the Trimble LaserStation and Topcon LaserZone systems provide accurate differences in elevation.

However, an inherent weakness in the pseudolite system is the vertical accuracy because it is difficult to position a number of pseudolites to creates a geometric relationship that is mathematically strong in the vertical, due to the fact that the ground based transmitters are commonly located at similar (+/−500 m) elevation.

In addition, an inherent weakness in laser systems is either their inability to provide horizontal position, or limitations on the range over which they can provide horizontal position.

SUMMARY OF THE INVENTION

The present invention addresses these problems by providing a positioning system that supports multiple users, provides accurate 3D positioning that works in areas where the satellite-based positioning systems will not work due to obstructions of the sky, and that provides a better vertical accuracy than a satellite-based system can provide.

One aspect of the present invention is directed to a radio and light based 3-D positioning system comprising a stationary integrated self-positioning radio transceiver/laser transmitter (RTR_LT) and at least one mobile integrated radio receiver/laser detector (RR_LD).

In one embodiment of the present invention, the stationary integrated self-positioning radio transceiver/laser transmitter (RTR_LT) is configured to receive a first plurality of external radio signals, to determine its position coordinates based on the first plurality of received external radio signals, to broadcast at least one internal radio signal; and to broadcast at least one laser beam. In this embodiment of the present invention, at least one mobile integrated radio receiver/laser detector (RR_LD) is configured to receive a second plurality of external radio signals, to receive at least one internal radio signal broadcasted by the stationary integrated self-positioning RTR_LT, to detect at least one laser beam generated by the self-positioning integrated RTR_LT, and to determine its 3-D position coordinates based on a set of data selected from the group consisting of: {the second plurality of received external radio signals; at least one received internal radio signal; and at least one detected laser beam}.

In one embodiment of the present invention, the stationary integrated self-positioning radio transceiver/laser transmitter (RTR_LT) further comprises a pseudolite transceiver and a laser transmitter integrated with the pseudolite transceiver. In one embodiment of the present invention, the pseudolite transceiver further comprises a stationary radio antenna; wherein a distance between a phase center of the stationary radio antenna and the laser transmitter is known and fixed.

In one embodiment of the present invention, the laser transmitter further comprises a plane laser transmitter configured to generate a reference laser beam providing a high accuracy vertical coordinate. In another embodiment of the present invention, the laser transmitter further comprises a fan laser transmitter configured to generate at least one rotating fan-shaped laser beam.

In one embodiment of the present invention, the pseudolite transceiver is configured to receive the first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

In one embodiment of the present invention, the stationary integrated self-positioning radio transceiver/laser transmitter (RTR_LT) further comprises a differential pseudolite transceiver and a laser transmitter. In this embodiment, the radio and light based 3-D positioning system of the present invention further comprises a first wireless communication link configured to connect the differential pseudolite transceiver to the source of differential correction data; and wherein the first wireless communication link is selected from the group consisting of: {a cellular link; a radio; a private radio band; a SiteNet 900 private radio network; a wireless Internet; a satellite wireless communication link; and an optical communication link}. In this embodiment of the present invention, the differential pseudolite transceiver is configured to receive the first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}; and configured to receive a set of differential corrections data broadcasted by at least one source selected from the group consisting of: {a Base Station, an RTK Base Station; a Virtual Base Station (VBS); and a pseudolite transmitter} by using the first wireless communication link. In this embodiment of the present invention, the differential pseudolite transceiver is configured to utilize the first plurality of external radio signals and the set of differential corrections data to obtain precise coordinate measurements of the differential pseudolite transceiver.

In one embodiment of the present invention, at least one mobile integrated radio receiver/laser detector (RR_LD) further comprises a radio positioning system receiver and a laser detector integrated with the radio positioning system receiver.

In one embodiment of the present invention, the radio positioning system receiver is configured to receive the second plurality of external radio signals broadcasted by at least one radio source selected from the group consisting of:

{GPS; GLONASS; combined GPS/GLONASS; GALILEO; Global Navigational Satellite System (GNSS); and a pseudolite transmitter}. In this embodiment of the present invention, the radio positioning system receiver is configured to determine its 3-D position coordinates based on the second plurality of received external radio signals.

In one embodiment, the radio and light based 3-D positioning system of the present invention further comprises a second wireless communication link configured to connect the mobile integrated radio receiver/laser detector (RR_LD) with the stationary integrated self-positioning radio transceiver/laser transmitter (RTR_LT). In one embodiment of the present invention, the second wireless communication link is selected from the group consisting of: {a cellular link; a radio; a private radio band; a SiteNet 900 private radio network; a wireless Internet; a satellite wireless communication link; and an optical communication link}.

In one embodiment of the present invention, at least one mobile integrated radio receiver/laser detector (RR_LD) further comprises a pseudolite receiver configured to receive at least one internal radio signal broadcasted by the stationary integrated self-positioning radio transceiver/laser transmitter (RTR_LT) by using the second wireless link. In this embodiment of the present invention, the mobile integrated radio receiver/laser detector (RR_LD) is configured to determine its 3-D position coordinates based on at least one received internal radio signal.

In one embodiment of the present invention, at least one mobile integrated radio receiver/laser detector (RR_LD) further comprises a radio receiver configured to receive the second plurality of external radio signals, and a laser detector configured to detect at least one laser beam generated by the stationary integrated self-positioning radio transceiver/laser transmitter (RTR_LT). In this embodiment of the present invention, the radio receiver further comprises a radio antenna, wherein the distance between a phase center of the radio antenna and the laser detector is known and fixed. In this embodiment of the present invention, the integrated radio receiver/laser detector (RR_LD) is configured to determine its 3-D position coordinates at a first level of accuracy based on the second plurality of received external radio signals, and the integrated radio receiver/laser detector (RR_LD) is configured to determine its elevation at a second level of accuracy based on at least one detected laser beam. It is assumed, that a set of measurements determined at the second level of accuracy is more accurate than the set of measurements determined at the first level of accuracy.

In one embodiment of the present invention, at least one mobile integrated radio receiver/laser detector (RR_LD) further comprises: a pseudolite receiver configured to receive at least one internal radio signal broadcasted by the stationary integrated self-positioning radio transceiver/laser transmitter (RTR_LT) by using the second wireless link, and a laser detector configured to detect at least one laser beam generated by the stationary integrated self-positioning radio transceiver/laser transmitter (RTR_LT). In this embodiment of the present invention, at least one mobile integrated radio receiver/laser detector (RR_LD) is configured to determine its position coordinates at the first level of accuracy based on at least one internal radio signal broadcasted by the stationary integrated self-positioning radio transceiver/laser transmitter (RTR_LT). In this embodiment of the present invention, at least one mobile integrated radio receiver/laser detector (RR_LD) is configured to determine its elevation at the second level of accuracy based on at least one detected laser beam.

In one embodiment of the present invention, at least one mobile integrated radio receiver/laser detector (RR_LD) further comprises: a radio receiver configured to receive the second plurality of external radio signals, a pseudolite receiver configured to receive at least one internal radio signal broadcasted by the stationary integrated self-positioning radio transceiver/laser transmitter (RTR_LT) by using the second wireless link, and a laser detector configured to detect at least one laser beam generated by the stationary integrated self-positioning radio transceiver/laser transmitter (RTR_LT). In this embodiment of the present invention, at least one mobile integrated radio receiver/laser detector (RR_LD) is configured to determine its 3-D position coordinates at the first level of accuracy based on at least one internal radio signal broadcasted by the stationary integrated self-positioning radio transceiver/laser transmitter (RTR_LT) and based on the second plurality of received external radio signals, and is configured to determine its elevation at the second level of accuracy based on at least one detected laser beam.

In one embodiment of the present invention, at least one mobile integrated radio receiver/laser detector (RR_LD) further comprises: a radio receiver configured to receive a first set of measurement data from the second plurality of external radio signals, a pseudolite receiver configured to receive a second set of measurement data from at least one internal radio signal broadcasted by the stationary integrated self-positioning radio transceiver/laser transmitter (RTR_LT) by using the second wireless link, a laser detector configured to detect at least one laser beam generated by the stationary integrated self-positioning radio transceiver/laser transmitter (RTR_LT) in order to receive a third set of measurement data, and a weighting processor configured to assign different weights to different sets of measurement data based on a measurement algorithm.

In one embodiment of the present invention, the measurement algorithm is optimized to take into account at least one measurement site parameter at the time of measurement. In this embodiment of the present invention, each measurement site parameter is selected from the group consisting of: {topology of the site; whether conditions at the site; and visibility of at least one laser beam at the site}.

Another aspect of the present invention is directed to a radio and light based 3-D positioning system comprising: a stationary integrated radio transmitter/laser transmitter (RT_LT) positioned in a location with known coordinates and at least one mobile integrated radio receiver/laser detector (RR_LD).

In one embodiment of the present invention, the stationary integrated radio transmitter/laser transmitter (RT_LT) is configured to broadcast at least one internal radio signal, and is configured to broadcast at least one laser beam.

In one embodiment of the present invention, at least one mobile integrated radio receiver/laser detector (RR_LD) is configured to receive a plurality of external radio signals, is configured to receive at least one internal radio signal broadcasted by the stationary integrated RT_LT, is configured to detect at least one laser beam generated by the integrated RT_LT, and is configured to determine its 3-D position coordinates based on a set of data selected from the group consisting of: {the plurality of received external radio signals; at least one received internal radio signal; and at least one detected laser beam}.

In one embodiment of the present invention, the stationary integrated radio transceiver/laser transmitter (RT_LT) further comprises a pseudolite transmitter, and a laser transmitter integrated with the pseudolite transmitter. The pseudolite transmitter further comprises a stationary radio antenna, wherein a distance between a phase center of the stationary radio antenna and the laser transmitter is known and fixed.

In one embodiment of the present invention, the laser transmitter further comprises a plane laser transmitter configured to generate a reference laser beam providing a high accuracy vertical coordinate. In another embodiment of the present invention, the laser transmitter further comprises a fan laser transmitter configured to generate at least one rotating fan-shaped laser beam.

In one embodiment of the present invention, at least one mobile integrated radio receiver/laser detector (RR_LD) further comprises a radio positioning system receiver and a laser detector integrated with the radio positioning system receiver.

In one embodiment of the present invention, the radio positioning system receiver is configured to receive a plurality of external radio signals broadcasted by at least one radio source selected from the group consisting of: {GPS; GLONASS; combined GPS/GLONASS; GALILEO; Global Navigational Satellite System (GNSS); and a pseudolite transmitter}, and is configured to determine its 3-D position coordinates based on the plurality of received external radio signals.

In one embodiment, the system of the present invention including the stationary integrated radio transmitter/laser transmitter (RT_LT) positioned in a location with known coordinates and at least one mobile integrated radio receiver/laser detector (RR_LD) further comprises a wireless link configured to connect the mobile integrated radio receiver/laser detector (RR_LD with the stationary integrated radio transmitter/laser transmitter (RT_LT).

In one embodiment of the present invention, the wireless communication link is selected from the group consisting of:{a cellular link; a radio; a private radio band; a SiteNet 900 private radio network; a wireless Internet; a satellite wireless communication link; and an optical communication link}.

In one embodiment of the present invention, at least one mobile integrated radio receiver/laser detector (RR_LD) further comprises a pseudolite receiver configured to receive at least one internal radio signal broadcasted by the stationary integrated radio transmitter/laser transmitter (RT_LT) by using the wireless link, and configured to determine its 3-D position coordinates based on at least one received internal radio signal.

In one embodiment of the present invention, at least one mobile integrated radio receiver/laser detector (RR_LD) further comprises a radio receiver configured to receive the plurality of external radio signals, and a laser detector configured to detect at least one laser beam generated by the stationary integrated radio transmitter/laser transmitter (RT_LT). The radio receiver further comprises a radio antenna; wherein the distance between a phase center of the radio antenna and the laser detector is known and fixed. In this embodiment of the present invention, the integrated radio receiver/laser detector (RR_LD) is configured to determine its 3-D position coordinates at a first level of accuracy based on the plurality of received external radio signals; and the integrated radio receiver/laser detector (RR_LD) is configured to determine its elevation at a second level of accuracy based on at least one detected laser beam.

In one embodiment of the present invention, at least one mobile integrated radio receiver/laser detector (RR_LD) further comprises a pseudolite receiver configured to receive at least one internal radio signal broadcasted by the stationary integrated radio transmitter/laser transmitter (RT_LT) by using the wireless link, and a laser detector configured to detect at least one laser beam generated by the stationary integrated radio transmitter/laser transmitter (RT_LT). In this embodiment of the present invention, at least one mobile integrated radio receiver/laser detector (RR_LD) is configured to determine its position coordinates at the first level of accuracy based on at least one internal radio signal broadcasted by the stationary integrated radio transmitter/laser transmitter (RT_LT), wherein at least one mobile integrated radio receiver/laser detector (RR_LD) is configured to determine its elevation at the second level of accuracy based on at least one detected laser beam.

In one embodiment of the present invention, at least one mobile integrated radio receiver/laser detector (RR_LD) further comprises: a radio receiver configured to receive the plurality of external radio signals, a pseudolite receiver configured to receive at least one internal radio signal broadcasted by the stationary integrated radio transmitter/ laser transmitter (RT_LT) by using the wireless link, and a laser detector configured to detect at least one laser beam generated by the stationary integrated radio transmitter/laser transmitter (RT_LT).In this embodiment of the present invention, at least one mobile integrated radio receiver/laser detector (RR_LD) is configured to determine its 3-D position coordinates at the first level of accuracy based on at least one internal radio signal broadcasted by the stationary integrated radio transmitter/laser transmitter (RTR_LT) and based on the plurality of received external radio signals. In this embodiment of the present invention, at least one mobile integrated radio receiver/laser detector (RR_LD) is configured to determine its elevation at the second level of accuracy based on at least one detected laser beam.

In one embodiment of the present invention, at least one mobile integrated radio receiver/laser detector (RR_LD) further comprises a radio receiver configured to receive a first set of measurement data from the plurality of external radio signals, a pseudolite receiver configured to receive a second set of measurement data from at least one internal radio signal broadcasted by the stationary integrated radio transmitter/laser transmitter (RT_LT) by using the wireless link, a laser detector configured to detect at least one laser beam generated by the stationary integrated radio transmitter/laser transmitter (RT_LT) in order to receive a third set of measurement data, and a weighting processor configured to assign different weights to different sets of measurement data based on a measurement algorithm.

In one embodiment of the present invention, the measurement algorithm is optimized to take into account at least one measurement site parameter at the time of measurement, wherein each measurement site parameter is selected from the group consisting of: {topology of the site; whether conditions at the site; and visibility of at least one laser beam at the site}.

One more aspect of the present invention is directed to a radio and light based 3-D positioning system comprising: a stationary radio transmitter positioned in a first location with known coordinates; a stationary laser transmitter positioned in a second location with known coordinates; and at least one mobile integrated radio receiver/laser detector (RR_LD).

In one embodiment of the present invention, the stationary radio transmitter is configured to broadcast at least one internal radio signal, whereas the stationary laser transmitter is configured to broadcast at least one laser beam. In this embodiment of the present invention, at least one mobile integrated radio receiver/laser detector (RR_LD) is configured to receive a plurality of external radio signals, is configured to receive at least one internal radio signal broadcasted by the stationary radio transmitter, is configured to detect at least one laser beam generated by the stationary laser transmitter, and is configured to determine its 3-D position coordinates based on a set of data selected from the group consisting of: {the plurality of received external radio signals; at least one received internal radio signal; and at least one detected laser beam}.

In one embodiment of the present invention, the stationary radio transmitter positioned in the first location with known coordinates further comprises a pseudolite transmitter.

In one embodiment of the present invention, the stationary laser transmitter positioned in the second location with known coordinates further comprises a plane laser transmitter configured to generate a reference laser beam providing a high accuracy vertical coordinate. In another embodiment of the present invention, the stationary laser transmitter positioned in the second location with known coordinates further comprises a fan laser transmitter configured to generate at least one rotating fan-shaped laser beam.

In one embodiment of the present invention, at least one mobile integrated radio receiver/laser detector (RR_LD) further comprises a radio positioning system receiver and a laser detector integrated with the radio positioning system receiver. The radio positioning system receiver further comprises a radio antenna, wherein the distance between a phase center of the radio antenna and the laser detector is known and fixed.

In one embodiment of the present invention, the radio positioning system receiver is configured to receive a plurality of external radio signals broadcasted by at least one radio source selected from the group consisting of: {GPS; GLONASS; combined GPS/GLONASS; GALILEO; Global Navigational Satellite System (GNSS); and a pseudolite transmitter}, and is configured to determine its 3-D position coordinates based on the plurality of received external radio signals.

In one embodiment, the system of the present invention further comprises: a wireless link configured to connect the mobile integrated radio receiver/laser detector (RR_LD) with the stationary radio transmitter, wherein the wireless communication link is selected from the group consisting of:{a cellular link; a radio; a private radio band; a SiteNet 900 private radio network; a wireless Internet; a satellite wireless communication link; and an optical communication link}.

In one embodiment of the present invention, at least one mobile integrated radio receiver/laser detector (RR_LD) further comprises a pseudolite receiver configured to receive at least one internal radio signal broadcasted by the stationary radio transmitter by using the wireless link, and configured to determine its 3-D position coordinates based on at least one received internal radio signal.

In one embodiment of the present invention, at least one mobile integrated radio receiver/laser detector (RR_LD) further comprises: a radio receiver configured to receive the plurality of external radio signals, and a laser detector configured to detect at least one laser beam generated by the stationary laser transmitter. In this embodiment of the present invention, the integrated radio receiver/laser detector (RR_LD) is configured to determine its 3-D position coordinates at the first level of accuracy based on the plurality of received external radio signals, and the integrated radio receiver/laser detector (RR_LD) is configured to determine its elevation at the second level of accuracy based on at least one detected laser beam.

In one embodiment of the present invention, at least one mobile integrated radio receiver/laser detector (RR_LD) further comprises: a pseudolite receiver configured to receive at least one internal radio signal broadcasted by the stationary radio transmitter by using the wireless link, and a laser detector configured to detect at least one laser beam generated by the stationary laser transmitter. In this embodiment of the present invention, at least one mobile integrated radio receiver/laser detector (RR_LD) is configured to determine its position coordinates at the first level of accuracy based on at least one internal radio signal broadcasted by the stationary radio transmitter, and at least one mobile integrated radio receiver/laser detector (RR_LD) is configured to determine its elevation at the second level of accuracy based on at least one detected laser beam.

In one embodiment of the present invention, at least one mobile integrated radio receiver/laser detector (RR_LD) further comprises: a radio receiver configured to receive the plurality of external radio signals, a pseudolite receiver configured to receive at least one internal radio signal broadcasted by the stationary radio transmitter by using the wireless link, and a laser detector configured to detect at least one laser beam generated by the stationary laser transmitter. In this embodiment of the present invention, at least one mobile integrated radio receiver/laser detector (RR_LD) is configured to determine its 3-D position coordinates at the first level of accuracy based on at least one internal radio signal broadcasted by the stationary radio transmitter and based on the plurality of received external radio signals, and is configured to determine its elevation at the second level of accuracy based on at least one detected laser beam.

In one embodiment of the present invention, at least one mobile integrated radio receiver/laser detector (RR_LD) further comprises: a radio receiver configured to receive a first set of measurement data from the plurality of external radio signals, a pseudolite receiver configured to receive a second set of measurement data from at least one internal radio signal broadcasted by the stationary radio transmitter by using the wireless link, a laser detector configured to detect at least one laser beam generated by the stationary laser transmitter in order to receive a third set of measurement data, and a weighting processor configured to assign different weights to different sets of measurement data based on a measurement algorithm.

In one embodiment of the present invention, the measurement algorithm is optimized to take into account at least one measurement site parameter at the time of measurement, wherein each measurement site parameter is selected from the group consisting of: {topology of the site; whether conditions at the site; and visibility of at least one laser beam at the site}.

One additional aspect of the present invention is directed to a method of determining the position coordinates of a mobile user by using a stationary integrated self-positioning radio transceiver/laser transmitter (RTR_LT).

In one embodiment, the method of the present invention comprises the following steps: (A) providing a radio and light based 3-D positioning system comprising a stationary integrated self-positioning radio transceiver/laser transmitter (RTR_LT) and the mobile user comprising a mobile integrated radio receiver/laser detector (RR_LD); (B) receiving a first plurality of external radio signals by using the stationary integrated self-positioning radio transceiver/ laser transmitter (RTR_LT);(C) determining position coordinates of the stationary integrated self-positioning radio transceiver/laser transmitter (RTR_LT) based on the first plurality of received external radio signals; (D) broadcasting at least one internal radio signal and broadcasting at least one laser beam by using the stationary integrated self-positioning radio transceiver/laser transmitter (RTR_LT); (E) receiving a second plurality of external radio signals, receiving at least one internal radio signal broadcasted by the stationary integrated self-positioning RTR_LT, and detecting the laser beam generated by the self-positioning integrated RTR_LT by using the mobile integrated radio receiver/laser detector (RR_LD); and (F) determining the 3-D position coordinates of the mobile integrated radio receiver/laser detector (RR_LD) based on a set of data selected from the group consisting of: {the second plurality of received external radio signals; at least one received internal radio signal; and at least one detected laser beam}.

In one embodiment of the present invention, the step (B) further comprises the step (B1) of receiving the first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

In one embodiment of the present invention, the step (B) further comprises the step (B2) of receiving a set of differential corrections data broadcasted by at least one source selected from the group consisting of: {a Base Station, an RTK Base Station; a Virtual Base Station (VBS); and a pseudolite transmitter}.

In one embodiment of the present invention, the step (D) further comprises the step (D1) of generating a reference laser beam providing a high accuracy vertical coordinate by using a plane laser transmitter. In another embodiment of the present invention, the step (D) further comprises the step (D2) of generating at least one rotating fan-shaped laser beam by using a fan laser transmitter.

In one embodiment of the present invention, the step (E) further comprises the step (E1) of receiving the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

In one embodiment of the present invention, the step (E) further comprises the step (E2) of detecting at least one laser beam generated by the stationary integrated self-positioning radio transceiver/laser transmitter (RTR_LT).

In one embodiment of the present invention, the step (F) further comprises the steps: (F1) of determining the 3-D position coordinates of the mobile integrated radio receiver/laser detector (RR_LD) at the first level of accuracy based on the second plurality of received external radio signals, and (F2) of determining the elevation coordinate of the mobile integrated radio receiver/laser detector (RR_LD) at the second level of accuracy based on at least one detected laser beam.

In one embodiment of the present invention, the step (F) further comprises the steps: (F3) of determining the 3-D position coordinates of the mobile integrated radio receiver/laser detector (RR_LD) at the first level of accuracy based on at least one internal radio signal broadcasted by the stationary integrated self-positioning radio transceiver/laser transmitter (RTR_LT) and based on the second plurality of received external radio signals, and (F4) of determining the elevation coordinate of the mobile integrated radio receiver/laser detector (RR_LD) at the second level of accuracy based on at least one detected laser beam.

In one embodiment of the present invention, the step (F) further comprises the step (F5) of assigning different weights to different sets of measurement data based on a measurement algorithm by using a weighting processor; wherein the measurement algorithm is optimized to take into account at least one measurement site parameter at the time of measurement; and wherein each measurement site parameter is selected from the group consisting of: {topology of the site; whether conditions at the site; and visibility of at least one laser beam at the site}.

Yet, one more aspect of the present invention is directed to a method of tracking at least one mobile unit utilizing a stationary integrated self-positioning radio transceiver/laser transmitter (RTR_LT), wherein at least one such mobile user comprises a mobile integrated radio receiver/laser detector (RR_LD).

In one embodiment, the tracking method of the present invention comprises the following steps: (A) determining position coordinates of the stationary integrated self-positioning radio transceiver/laser transmitter (RTR_LT) based on a first plurality of external radio signals; (B) substantially continuously broadcasting at least one internal radio signal and broadcasting at least one laser beam by using the stationary integrated self-positioning radio transceiver/laser transmitter (RTR_LT); (C) receiving a second plurality of external radio signals, receiving at least one internal radio signal broadcasted by the stationary integrated self-positioning RTR_LT, and detecting the laser beam generated by the self-positioning integrated RTR_LT by using at least one mobile integrated radio receiver/laser detector (RR_LD); (D) determining the 3-D position coordinates of at least one mobile integrated radio receiver/laser detector (RR_LD) based on a set of data selected from the group consisting of: {the second plurality of received external radio signals; at least one received internal radio signal; and at least one detected laser beam}; and (E) sending back to the stationary integrated self-positioning RTR_LT laser transmitter the 3-D position coordinates measurements of at least one mobile integrated radio receiver/laser detector (RR_LD).

In one embodiment, wherein the stationary integrated self-positioning radio transceiver/laser transmitter (RTR_LT) further includes a display block, the tracking method of the present invention further comprises the step: (F) of displaying the 3-D position coordinates measurements of at least one mobile integrated radio receiver/laser detector (RR_LD).

Yet, another aspect of the present invention is directed to a method of method of determining the position coordinates of a mobile user comprising the steps of: (A) providing a radio and light based 3-D positioning system comprising a stationary integrated radio transmitter/laser transmitter (RT_LT) positioned in a known location and the mobile user comprising a mobile integrated radio receiver/laser detector (RR_LD); (B) broadcasting at least one internal radio signal and broadcasting at least one laser beam by using the stationary integrated radio transmitter/laser transmitter (RT_LT); (C) receiving a plurality of external radio signals, receiving at least one internal radio signal broadcasted by the stationary integrated RT_LT, and detecting the laser beam generated by the stationary integrated RT_LT by using the mobile integrated radio receiver/laser detector (RR_LD); and (D) determining the 3-D position coordinates of the mobile integrated radio receiver/laser detector (RR_LD) based on a set of data selected from the group consisting of:

{the plurality of received external radio signals; at least one received internal radio signal; and at least one detected laser beam}.

In one embodiment of the present invention, the step (C) further comprises the step(C2) of detecting at least one laser beam generated by the stationary integrated radio transmitter/laser transmitter (RT_LT).

In one embodiment of the present invention, the step (D) further comprises the steps: (D1) of determining the 3-D position coordinates of the mobile integrated radio receiver/laser detector (RR_LD) at the first level of accuracy based on the plurality of received external radio signals, and (D2) of determining the elevation coordinate of the mobile integrated radio receiver/laser detector (RR_LD) at the second level of accuracy based on at least one detected laser beam.

In one embodiment of the present invention, the step (D) further comprises the steps: (D3) of determining the 3-D position coordinates of the mobile integrated radio receiver/laser detector (RR_LD) at the first level of accuracy based on at least one internal radio signal broadcasted by the stationary integrated radio transmitter/laser transmitter (RT_LT) and based on the plurality of received external radio signals, and (D4) of determining the elevation coordinate of the mobile integrated radio receiver/laser detector (RR_LD) at the second level of accuracy based on at least one detected laser beam.

In one embodiment, the step (D) further comprises the step (D5) of assigning different weights to different sets of measurement data based on a measurement algorithm by using a weighting processor; wherein the measurement algorithm is optimized to take into account at least one measurement site parameter at the time of measurement; and wherein each measurement site parameter is selected from the group consisting of: {topology of the site; whether conditions at the site; and visibility of at least one laser beam at the site}.

Yet, one more aspect of the present invention is directed to a method of tracking at least one mobile unit utilizing a stationary integrated radio transmitter/laser transmitter (RT_LT) positioned in a known location, wherein at least one mobile user comprises a mobile integrated radio receiver/laser detector (RR_LD).

In one embodiment, the tracking method of the present invention comprises the following steps: (A) substantially continuously broadcasting at least one internal radio signal and broadcasting at least one laser beam by using the stationary integrated radio transmitter/laser transmitter (RT_LT); (B) receiving a plurality of external radio signals, receiving at least one internal radio signal broadcasted by the stationary integrated RT_LT, and detecting the laser beam generated by the stationary integrated RT_LT by using at least one mobile integrated radio receiver/laser detector (RR_LD); (C) determining the 3-D position coordinates of at least one mobile integrated radio receiver/laser detector (RR_LD) based on a set of data selected from the group consisting of: {the second plurality of received external radio signals; at least one received internal radio signal; and at least one detected laser beam}; (D) sending back to the stationary integrated RT_LT the 3-D position coordinates measurements of at least one mobile integrated radio receiver/laser detector (RR_LD), and (optionally) (E) displaying the 3-D position coordinates measurements of at least one mobile integrated radio receiver/laser detector (RR_LD), wherein the stationary integrated radio transmitter/laser transmitter (RT_LT) further includes a display block.

Yet, one additional aspect of the present invention is directed to a method of determining the position coordinates of a mobile user by utilizing a stationary radio transmitter positioned at a first location with known coordinates, and by utilizing a stationary laser transmitter positioned at a second location with known coordinates.

In one embodiment, the method of the present invention comprises the following steps:(A) providing a stationary radio transmitter positioned at a first location with known coordinates; providing a stationary laser transmitter positioned at a second location with known coordinates; and providing the mobile user comprising a mobile integrated radio receiver/laser detector (RR_LD); (B) broadcasting at least one internal radio signal by using the stationary radio transmitter positioned at the first location with known coordinates; (C) broadcasting at least one laser beam by using the stationary laser transmitter positioned at the second location with known coordinates; (D) receiving a plurality of external radio signals, receiving at least one internal radio signal broadcasted by the stationary radio transmitter positioned at the first location with known coordinates; and detecting the laser beam generated by the stationary laser transmitter positioned at the second location with known coordinates by using the mobile integrated radio receiver/laser detector (RR_LD); and (E) determining the 3-D position coordinates of the mobile integrated radio receiver/laser detector (RR_LD) based on a set of data selected from the group consisting of: {the plurality of received external radio signals; at least one received internal radio signal; and at least one detected laser beam}.

In one embodiment of the present invention, the step (D) further comprises the step (D2) of detecting at least one laser beam generated by the stationary laser transmitter.

In one embodiment of the present invention, the step (E) further comprises the steps: (E1) of determining the 3-D position coordinates of the mobile integrated radio receiver/laser detector (RR_LD) at the first level of accuracy based on the plurality of received external radio signals; and (E2) determining the elevation coordinate of the mobile integrated radio receiver/laser detector (RR_LD) at the second level of accuracy based on at least one detected laser beam.

In one embodiment of the present invention, the step (E) further comprises the steps: (E3) of determining the 3-D position coordinates of the mobile integrated radio receiver/laser detector (RR_LD) at the first level of accuracy based on at least one internal radio signal broadcasted by the stationary radio transmitter and based on the plurality of received external radio signals, and (E4) of determining the elevation coordinate of the mobile integrated radio receiver/laser detector (RR_LD) at the second level of accuracy based on at least one detected laser beam.

In one embodiment of the present invention, the step (E) further comprises the step (E5) of assigning different weights to different sets of measurement data based on a measurement algorithm by using a weighting processor; wherein the measurement algorithm is optimized to take into account at least one measurement site parameter at the time of measurement; and wherein each measurement site parameter is selected from the group consisting of: {topology of the site; whether conditions at the site; and visibility of at least one laser beam at the site}.

One more additional aspect of the present invention is directed to a method of tracking at least one mobile unit utilizing a stationary radio transmitter positioned at a first location with known coordinates and utilizing a stationary laser transmitter positioned at a second location with known coordinates, wherein at lest one mobile user comprises a mobile integrated radio receiver/laser detector (RR_LD).

In one embodiment of the present invention, the method comprises the following steps: (A) substantially continuously broadcasting at least one internal radio signal by using the stationary radio transmitter positioned at the first location with known coordinates; (B) substantially continuously broadcasting at least one laser beam by using the stationary laser transmitter positioned at the second location with known coordinates; (C) receiving a plurality of external radio signals, receiving at least one internal radio signal broadcasted by the stationary radio transmitter positioned at the first location with known coordinates; and detecting the laser beam generated by the stationary laser transmitter positioned at the second location with known coordinates by using the mobile integrated radio receiver/laser detector (RR_LD); (D) determining the 3-D position coordinates of the mobile integrated radio receiver/laser detector (RR_LD) based on a set of data selected from the group consisting of: {the plurality of received external radio signals; at least one received internal radio signal; and at least one detected laser beam}; (E) sending back to the stationary radio transmitter positioned at the first location with known coordinates and sending back to the stationary laser transmitter positioned at the second location with known coordinates the 3-D position coordinates measurements of at least one mobile integrated radio receiver/laser detector (RR_LD); and (optionally) (F) displaying the 3-D position coordinates measurements of at least one such mobile integrated radio receiver/laser detector (RR_LD), wherein the radio transmitter positioned at the first location with known coordinates includes a first display block; and wherein the stationary laser transmitter positioned at the second location with known coordinates includes a second display block.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

FIG. 1 depicts a radio and light based 3-D positioning system of the present invention comprising a stationary integrated self-positioning radio transceiver/laser transmitter (RTR_LT) and at least one mobile integrated radio receiver/laser detector (RR_LD).

FIG. 2 illustrates a radio and light based 3-D positioning system of the present invention comprising a stationary integrated radio transmitter/laser transmitter (RT_LT) positioned in a location with known coordinates and at least one mobile integrated radio receiver/laser detector (RR_LD).

FIG. 3 shows a radio and light based 3-D positioning system of the present invention comprising a stationary radio transmitter positioned in a first location with known coordinates; a stationary laser transmitter positioned in a second location with known coordinates; and at least one mobile integrated radio receiver/laser detector (RR_LD).

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

In one embodiment of the present invention, FIG. 1 depicts a radio and light based 3-D positioning system 10 comprising a stationary integrated self-positioning radio transceiver/laser transmitter (RTR_LT) 12 and a mobile integrated radio receiver/laser detector (RR_LD) 14.

In one embodiment of the present invention, the stationary integrated self-positioning radio transceiver/laser transmitter (RTR_LT) 12 is configured to receive a first plurality of external radio signals, to determine its position coordinates based on the first plurality of received external radio signals, to broadcast at least one internal radio signal; and to broadcast at least one laser beam. (Please, see the discussion below). In this embodiment of the present invention, the mobile integrated radio receiver/laser detector (RR_LD) 14 is configured to receive a second plurality of external radio signals, to receive at least one internal radio signal broadcasted by the stationary integrated self-positioning RTR_LT, to detect at least one laser beam generated by the self-positioning integrated RTR_LT, and to determine its 3-D position coordinates based on a set of data selected from the group consisting of: {the second plurality of received external radio signals; at least one received internal radio signal; and at least one detected laser beam}. (Please, see the discussion below).

More specifically, in one embodiment of the present invention, as shown in FIG. 1, the stationary integrated self-positioning radio transceiver/laser transmitter (RTR_LT) 12 further comprises a radio transceiver 18 and a laser transmitter 16 integrated with the radio transceiver 18. In one embodiment of the present invention, the pseudolite transceiver further comprises a stationary radio antenna 28 wherein a distance between a phase center of the stationary radio antenna 28 and the laser transmitter 16 is known and fixed.

The stationary integrated self-positioning radio transceiver/laser transmitter (RTR_LT) 12 provides a number of benefits to a potential user comparatively with a system that mechanically combines a laser system and a transceiver system. Indeed, the stationary radio transceiver 18 integrated with the laser transmitter 16 has the reduced cost as opposed to the cost of the combined laser and transceiver system because the integrated system requires only one set of packaging, can utilize a shared computer memory and can use a common power supply. In addition, as was stated above, in the integrated system the laser beam and the electrical phase center of the stationary antenna are separated by a known and fixed distance (not shown), wherein in the mechanically combined system the distance between the laser beam and the electrical phase center of the transceiver stationary antenna is prone to errors because this distance is introduced by an operator of the integrated system.

In the real world most construction accuracies are relative not absolute. A self surveying transmitter with laser will provide a starting point with an accuracy of 1–2 centimeters. The laser will reduce the noise on the vertical measurement providing the ability to generate a very smooth surface (+/−5 mm) which may have a bias of 1–2 centimeters because of the noise in the initial GPS position. For most work this will be acceptable.

The other thing that will commonly occur is to "bench" the system, so even though the self surveying instrument has some vertical error, this will be removed by taking a reference measurement to a benchmark and an offset is calculated and applied to correct for the vertical error. This combined with the low noise laser reference plane will produce both an accurate and a smooth surface.

In addition, even in absolute terms, the RTK GPS system will, over time, determine it's z accuracy to the mm range and thereby allow the self-positioning system to function as described.

Referring still to FIG. 1, in one embodiment of the present invention, the laser transmitter 16 further comprises a plane laser transmitter configured to generate a reference laser beam 40 providing a high accuracy vertical coordinate. Similar plane laser transmitter is fully disclosed in the U.S. Pat. No. 6,433,866 "High precision GPS/RTK and laser machine control" assigned to the assignee of the present invention. The U.S. Pat. No. 6,433,866 is incorporated herein in its entirety.

More specifically, according to the '866 patent, the laser transmitter 16 includes a rotating laser system. In a rotating laser system a laser source spins (mechanically, or optically) in the horizontal plane (or Z-plane). The rotating laser emits a laser beam that provides an accurate reference plane with a millimeter accuracy. However, to detect and get benefit of the rotating laser beam, the potential user has to be located within vertical range, and has to be equipped with a laser detector (or a laser receiver) capable of receiving the rotating laser beam. In the mechanical embodiment, the motor physically rotates the laser and accordingly the laser beam. In the optical embodiment, the mirror rotates in such a way that the physically non-rotating laser emits the rotating laser beam.

Trimble Navigation Ltd. manufactures a 3D Laser Station that generates at least one rotating fan-shaped laser beam 40 (and/or 41). The detailed description of such fan laser transmitter is given in the copending patent application A-1500 "COMBINATION LASER SYSTEM AND GLOBAL NAVIGATION SATELLITE SYSTEM" that is incorporated by reference herein in its entirety. The copending patent application A-1500 is assigned to the assignee of the present patent application.

Referring still to FIG. 1, the stationary radio transceiver 18 can be selected from the group consisting of: {a GPS receiver; a GLONASS receiver; a combined GPS/GLONASS receiver; a GALILEO receiver; a Global Navigational Satellite System (GNSS) receiver; and a pseudolite receiver}.

The Global Positioning System (GPS) is a system of satellite signal transmitters that transmits information from which an observer's present location and/or the time of observation can be determined. Another satellite-based navigation system is called the Global Orbiting Navigational System (GLONASS), which can operate as an alternative or supplemental system.

The GPS was developed by the United States Department of Defense (DOD) under its NAVSTAR satellite program. A fully operational GPS includes more than 24 Earth orbiting satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Generally, four or more GPS satellites will be visible from most points on the Earth's surface, which can be used to determine an observer's position anywhere on the Earth's surface. Each satellite carries a cesium or rubidium atomic clock to provide timing information for the signals transmitted by the satellites. An internal clock correction is provided for each satellite clock.

Each GPS satellite continuously transmits two spread spectrum, L-band carrier signals: an L1 signal having a frequency $f1=1575.42$ MHz (approximately nineteen centimeter carrier wavelength) and an L2 signal having a frequency $f2=1227.6$ MHz (approximately twenty-four centimeter carrier wavelength). These two frequencies are integral multiplies $f1=1,540\ f0$ and $f2=1,200\ f0$ of a base frequency $f0=1.023$ MHz. The L1 signal from each satellite is binary phase shift key (BPSK) modulated by two pseudo-random noise (PRN) codes in phase quadrature, designated as the C/A-code and P-code. The L2 signal from each satellite is BPSK modulated by only the P-code. The nature of these PRN codes and accepted methods for generating the C/A-code and P-code are set forth in the document ICD-GPS-200: GPS Interface Control Document, ARINC Research, 1997, GPS Joint Program Office, which is incorporated by reference herein.

The GPS satellite bit stream includes navigational information on the ephemeris of the transmitting GPS satellite (which includes orbital information about the transmitting satellite within next several hours of transmission) and an almanac for all GPS satellites (which includes a less detailed orbital information about all satellites). The transmitted satellite information also includes parameters providing corrections for ionospheric signal propagation delays (suitable for single frequency receivers) and for an offset time between satellite clock time and true GPS time. The navigational information is transmitted at a rate of 50 Baud.

A second satellite-based navigation system is the Global Orbiting Navigation Satellite System (GLONASS), placed in orbit by the former Soviet Union and now maintained by the Russian Republic. GLONASS uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS satellites have circular orbits with a radii of about 25,510 kilometers and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carrier signals L1 and L2 with frequencies of $f1=(1.602+9\ k/16)$ GHz and $f2=(1.246+7\ k/16)$ GHz, where $k=(1,2,\ldots 24)$ is the channel or satellite number. These frequencies lie in two bands at 1.597–1.617 GHz (L1) and 1,240–1,260 GHz (L2). The L1 signal is modulated by a C/A-code (chip rate=0.511 MHz) and by a P-code (chip rate=5.11 MHz). The L2 signal is presently modulated only by the P-code. The GLONASS satellites also transmit navigational data at a rate of 50 Baud. Because the channel frequencies are distinguishable from each other, the P-code is the same, and the C/A-code is the same, for each satellite. The methods for receiving and demodulating the GLONASS signals are similar to the methods used for the GPS signals.

As disclosed in the European Commission "White Paper on European transport policy for 2010", the European Union will develop an independent satellite navigation system Galileo as a part of a global navigation satellite infrastructure (GNSS).

The GALILEO system is based on a constellation of 30 satellites and ground stations providing information concerning the positioning of users in many sectors such as transport (vehicle location, route searching, speed control, guidance systems, etc.), social services (e.g. aid for the disabled or elderly), the justice system and customs services (location of suspects, border controls), public works (geographical information systems), search and rescue systems, or leisure (direction-finding at sea or in the mountains, etc.).

The range of GALILEO services is designed to meet practical objectives and expectations, from improving the coverage of open-access services in urban environments (to cover 95% of urban districts compared with the 50% currently covered by GPS alone) which will benefit the 160 million private vehicles in Europe, or enabling the use of satellite navigation applications "indoors", in buildings and even in tunnels, or indeed mobile telephone services based on identifying the caller's position.

Reference to a Radio Positioning System herein refers to a Global Positioning System, to a Global Orbiting Navigation System, to GALILEO System, and to any other compatible Global Navigational Satellite System (GNSS) satellite-based system that provides information by which an observer's position and the time of observation can be determined, all of which meet the requirements of the present invention, and to a ground based radio positioning system such as a system comprising of one or more pseudolite transmitters.

Referring still to FIG. 1, after the navigational processor 60 determines the coordinates of the i-th satellite (or i-th pseudolite) by demodulating the transmitted ephemeris parameters received by the radio transceiver 18, the navigational processor 60 can obtain the solution of the set of the simultaneous equations for its unknown coordinates ($x_0$, $y_0$, $z_0$) and for unknown time bias error (cb). The navigational processor 60 can also determine velocity of a moving platform.

Referring still to FIG. 1, in one embodiment of the present invention, the radio transceiver 18 further comprises a pseudolite transceiver 18 configured to receive the first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}. Preferably, the pseudolite transceiver 18 is configured to receive the first plurality of external radio signals broadcasted by at least four radio sources selected from the group consisting of: {GPS; GLONASS; combined GPS/GLONASS; GALILEO; Global Navigational Satellite System (GNSS); and a pseudolite transmitter}.

A pseudolite comprises a ground based radio positioning system working in any radio frequency including but not limited to the GPS frequencies and the ISM (industrial scientific medical) unlicensed operation band, including 900 MHz, 2.4 GHz, 5.8 GHz, or 18 GHz bands. Pseudolites can be used for enhancing the GPS by providing increased accuracy, integrity, and availability.

The complete description of the pseudolite transmitters in GPS band can be found in 'Global Positioning System: Theory and Applications; Volume II", edited by Bradford W. Parkinson and James J. Spilker Jr., and published in Volume 164 in "PROGRESS IN ASTRONAUTICS AND AERONAUTICS", by American Institute of Aeronautic and Astronautics, Inc., in 1966.

In the ISM band, including 900 MHz, 2.4 GHz, 5.8 GHz, or 18 GHz bands, the user can own both ends of the ISM communication system. The ISM technologies are manufactured by Trimble Navigation Limited, Sunnyvale, Calif. Metricom, Los Gatos, Calif. and by Utilicom, Santa Barbara, Calif.

Pseudolites as radio positioning systems can be configured to operate in the ISM band.

The following discussion is focused on a GPS receiver, though the same approach can be used for a GLONASS receiver, for a GPS/GLONASS combined receiver, GALILEO receiver, or any other radio transceiver.

In one embodiment, the radio transceiver 16 (of FIG. 1) can comprise a differential GPS receiver. In differential position determination, many of the errors in the radio positioning signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms. The differential GPS receiver can include: (a) a real time code differential GPS; (b) a post-processing differential GPS; (c) a real-time kinematic (RTK) differential GPS that includes a code and carrier RTK differential GPS receiver.

The differential GPS receiver can obtain the differential corrections from different sources.

Referring still to FIG. 1, in one embodiment of the present invention, the differential GPS receiver 118 can obtain the differential corrections from a Base Station 20.

The fixed Base Station (BS) placed at a known location determines the range and range-rate measurement errors in each received GPS signal and communicates these measurement errors as corrections to be applied by local users. The Base Station (BS) has its own imprecise clock with the clock bias CBBASE. As a result, the local users are able to obtain more accurate navigation results relative to the Base Station location and the Base Station clock. With proper equipment, a relative accuracy of 5 meters should be possible at distances of a few hundred kilometers from the Base Station.

Referring still to FIG. 1, in another embodiment of the present invention, the differential GPS receiver 18 can be implemented by using a TRIMBLE Ag GPS-132 receiver that obtains the differential corrections from the U.S. Cost Guard service free in 300 kHz band broadcast by using the wireless communication device (not shown) and the first wireless communication link 22. In this embodiment, the laser transmitter 16 integrated with the differential GPS receiver 18 should be placed within (2–300) miles from the U.S. Cost Guard Base Station. The accuracy of this differential GPS method is about 50 cm.

Referring still to FIG. 1, in one embodiment of the present invention, the differential corrections can be obtained from the Wide Area Augmentation System (WAAS) by using the wireless communication device (not shown) and the first wireless communication link 22. The WAAS system includes a network of Base Stations that uses satellites (initially geostationary satellites-GEOs) to broadcast GPS integrity and correction data to GPS users. The WAAS provides a ranging signal that augments the GPS. The WAAS ranging signal is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is better than 1 meter.

Referring still to FIG. 1, in one embodiment of the present invention, the real time kinematic (RTK) differential GPS receiver 18 can be used to obtain the position locations with less than 2 cm accuracy. The RTK differential GPS receiver receives the differential corrections from the Base Station 20 placed in a known location within (10–50) km by using the wireless communication device (not shown) and the first wireless communication link 22. For a high accuracy measurement, the number of whole cycle carrier phase shifts between a particular GPS satellite and the RTK GPS receiver is resolved because at the receiver every cycle will appear the same. Thus, the RTK GPS receiver solves in real time an "integer ambiguity" problem, which is the problem of determining the number of whole cycles of the carrier satellite signal between the GPS satellite being observed and the RTK GPS receiver. Indeed, the error in one carrier cycle L1 (or L2) can change the measurement result by 19 (or 24) centimeters, which is an unacceptable error for the centimeter-level accuracy measurements.

Referring still to FIG. 1, in one embodiment of the present invention, the differential corrections can be obtained by the radio transceiver 18 from the Virtual Base Station (VBS) 20 by using the wireless communication device (not shown) and the first wireless communication link 22.

The Virtual Base Station (VBS) is configured to deliver a network-created correction data to a multiplicity of rovers via a concatenated communications link consisting of a single cellular connection, and a radio transmission or broadcasting system. The location of the radio transmitting system can be co-located with a GPS Base Station designated as the position of the local Virtual Reference Station. This GPS Base Station determines its position using GPS, and transmits its location to the VRS Base Station via a cellular link between the local GPS Base Station and the VRS Base Station. It enables the VRS Base Station to generate differential corrections as if such differential corrections were actually being generated at the real GPS Base Station location. These corrections can be delivered to the radio transceiver 18 by using the first wireless communication link 22 and a wireless communication device (not shown).

An article "Long-Range RTK Positioning Using Virtual Reference Stations," by Ulrich Vollath, Alois Deking, Herbert Landau, and Christian Pagels, describing VRS in more details, is incorporated herein as a reference in its entirety, and can be accessed at the following URL: http://trl.trimble.com/dscgi/ds.py/Get/File-93152/KIS2001-Paper-LongRange.pdf.

Referring still to FIG. 1, in one embodiment of the present invention, the first wireless communication link 22 can be implemented by using a variety of different embodiments.

In general, the first wireless communication link 22 (of FIG. 1) can be implemented by using a radio wave frequency band, an infrared frequency band, or a microwave frequency band. In one embodiment, the wireless communication link can include the ISM band, including 900 MHz, 2.4 GHz, 5.8 GHz, or 18 GHz bands, wherein the user can own both ends of the ISM communication system.

In one embodiment of the present invention, the first wireless communication link 22 (of FIG. 1) can be implemented by using the Trimble SiteNet™ 900 private radio network. The Trimble SiteNet™ 900 private radio network is a rugged, multi-network, 900 MHz radio modem designed specifically for the construction and mining industries. It is used to establish robust, wireless data broadcast networks for real-time, high-precision GPS applications. This versatile Trimble radio operates in the frequency range of 902–928 MHz, broadcasting, repeating, and receiving real-time data used by Trimble GPS receivers. Under optimal conditions, the SiteNet 900 radio broadcasts data up to 10 km (6.2 miles) line-of-sight and coverage can be enhanced by using a network of multi-repeaters. Using the SiteNet 900 radio as a repeater, enables one to provide coverage in previously inaccessible or obstructed locations. The SiteNet 900 radio is so versatile, that one can easily change its operating mode to suit any network configuration. This reduces costs and maximizes uptime. Additionally, SiteNet 900 is license free in the U.S.A. and Canada, which makes it extremely portable. One can move it from project to project without licensing hassles and restrictions. The SiteNet 900 radio is designed to operate reliably in demanding RF environments where many other products and technologies cannot. Optimized for GPS with increased sensitivity and jamming immunity, the SiteNet 900 radio also has error correction, and a high-speed data rate, ensuring maximum performance. The SiteNet 900 radio is especially suited for use with Trimble's SiteVision™ GPS grade control system, and is ideal for all GPS machine control applications where reliability is important. The machine-rugged unit has been designed and built especially for harsh construction and mining environments. Fully sealed against dust, rain, splash, and spray, the SiteNet 900 radio remains reliable in all weather. The radio's ruggedness and reliability minimizes downtime, lowering ownership costs. Trimble's SiteNet 900 radio can be used with any Trimble GPS receiver, including: MS750, MS850, MS860, and 5700 receivers.

In one embodiment of the present invention, the first wireless communication link 22 (of FIG. 1) can be implemented by using a 1.8 GHz band that supports the personal communications services (PCS). The PCS uses the international standard DCS-1800. Yet, in one more embodiment, the first wireless communication link can include a real time circuit switched wireless communication link. For instance, the first wireless communication link employing a real time circuit switched wireless communication link can include the Iridium satellite system produced by Motorola, Schaumburg, Ill.

In one additional embodiment, the first wireless communication link can be implemented by using a system of Low Earth Orbiting Satellites (LEOS), a system of Medium Earth Orbiting Satellites (MEOS), or a system of Geostationary Earth Orbiting Satellites (GEOS) which can be used to store and to forward digital packet data. For instance, the LEOS systems in (20–30) GHz range are manufactured by Cellular Communications located in Redmond, Wash., and the LEOS systems in (1.6–2.5) GHz range are produced by Loral/Qualcomm located in San Diego, Calif.

The first wireless communication link 22 can also include a cellular telephone communication means, a paging signal receiving means, wireless messaging services, wireless application services, a wireless WAN/LAN station, or an Earth-satellite-Earth communication module that uses at least one satellite to relay a radio wave signal. The first wireless communication link can also include the cellular telephone communication means that can include an Advanced Mobile Phone System (AMPS) with a modem. The modem can comprise a DSP (digital signal processor) modem in 800 MHZ range, or a cellular digital packet data (CDPD) modem in 800 MHZ range. The cellular digital communication means includes a means of modulation of digital data over a radio link using a time division multiple access (TDMA) system employing format IS-54, a code division multiple access (CDMA) system employing format IS-95, or a frequency division multiple access (FDMA). The TDMA system used in Europe is called groupe special mobile (GSM) in French.

In one embodiment of the present invention, the first wireless communication link 22 (of FIG. 1) can be implemented by using an optical communication link, including an additional laser link (not shown).

Referring still to FIG. 1, in one embodiment of the present invention, the mobile integrated radio receiver/laser detector (RR_LD) 14 further comprises a radio positioning system receiver 48 and a laser detector 52 integrated with the radio positioning system receiver 48.

In one embodiment of the present invention, each mobile unit 14 is equipped with a laser detector 52 comprising a number of diodes. A laser receiver measures the signal strength on a number of diodes to determine the center of a laser beam. Topcon, Laser Systems, Inc., located in Pleasanton, Calif., manufactures machine mounted laser receivers: 9130 laser tracker and LS-B2 laser receiver. For reference, please see the '866 US Patent.

In one embodiment of the present invention, the radio positioning system receiver 48 is configured to receive the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

Preferably, in one embodiment of the present invention, the radio positioning system receiver 48 is configured to receive the second plurality of external radio signals broadcasted by at least four radio sources selected from the group consisting of: {GPS; GLONASS; combined GPS/GLONASS; GALILEO; Global Navigational Satellite System (GNSS); and a pseudolite transmitter}.

In one embodiment of the present invention, the stationary radio transceiver 18 and the mobile radio receiver 48 are selected to include the same GPS receiver configured to receive the satellite signals from the four GPS satellite-vehicles SV1 30, SV2 24, SV 34, and SV 36.

In this embodiment of the present invention, the radio positioning system receiver is configured to determine its 3-D position coordinates based on the second plurality of received external radio signals by using its navigational processor 54.

Referring still to FIG. 1, in one embodiment of the present invention, the radio and light based 3-D positioning system 10 further comprises a second wireless communication link 38 configured to connect the mobile integrated radio receiver/laser detector (RR_LD) 14 with the stationary integrated self-positioning radio transceiver/laser transmitter (RTR_LT) 12. In one embodiment of the present invention, the second wireless communication link 38 is selected from the group consisting of: {a cellular link; a radio; a private radio band; a SiteNet 900 private radio network; a wireless Internet; a satellite wireless communication link; and an optical communication link}.

In one embodiment of the present invention, the mobile integrated radio receiver/laser detector (RR_LD) 14 further comprises a pseudolite receiver 50 configured to receive at least one internal radio signal broadcasted by the radio transceiver 18 by using the second wireless link 38 and antenna 44. In this embodiment of the present invention, the mobile integrated radio receiver/laser detector (RR_LD) 14 is configured to determine its 3-D position coordinates based on at least one received internal radio signal by using its navigation processor 54.

In one embodiment of the present invention, the mobile integrated radio receiver/laser detector (RR_LD) 14 further comprises the radio receiver 48 configured to receive the second plurality of external radio signals by using an antenna 56, and the laser detector 52 configured to detect at least one laser beam 40 (and/or 41) generated by the laser transmitter 16. In this embodiment of the present invention, the integrated radio receiver/laser detector (RR_LD) 14 is configured to determine its 3-D position coordinates at the first level of accuracy (at the meter or at the centimeter level) based on the second plurality of received external radio signals, and is configured to determine its elevation at the second level of accuracy (at the millimeter level) based on at least one detected laser beam 40 (and/or 41) by using its navigation processor 54.

Referring still to FIG. 1, in one embodiment of the present invention, the mobile integrated radio receiver/laser detector (RR_LD) 14 further comprises: a pseudolite receiver 50 configured to receive at least one internal radio signal broadcasted by the radio transceiver 18 by using the second wireless link 38, and a laser detector 52 configured to detect at least one laser beam 40 (and/or 41) generated by the laser transmitter 16. In this embodiment of the present invention, the mobile integrated radio receiver/laser detector (RR_LD) 14 is configured to determine its position coordinates at the first (meter or centimeter) level of accuracy based on at least one internal radio signal broadcasted by the stationary integrated self-positioning radio transceiver/laser transmitter (RTR_LT), and is configured to determine its elevation at the second (millimeter) level of accuracy based on at least one detected laser beam 40 (and/or 41).

Referring still to FIG. 1, in one embodiment of the present invention, the mobile integrated radio receiver/laser detector (RR_LD)14 further comprises: the radio receiver 48 configured to receive the second plurality of external radio signals, the pseudolite receiver 50 configured to receive at least one internal radio signal broadcasted by the transceiver 18 by using the second wireless link 38, and the laser detector 52 configured to detect at least one laser beam 40 (and/or 41) generated by the stationary laser transmitter 16. In this embodiment of the present invention, the mobile integrated radio receiver/laser detector (RR_LD) 14 is configured to determine its 3-D position coordinates at the first (centimeter or meter) level of accuracy based on at least one internal radio signal broadcasted by the stationary radio transceiver 18 and based on the second plurality of received external radio signals broadcasted by the satellites SV#1 30, SV#2 32, SV#3 34, and SV#4 36, or broadcasted by some other external radio-sources (not shown), and is configured to determine its elevation at the second (millimeter) level of accuracy based on at least one detected laser beam 40 (and/or 41).

Referring still to FIG. 1, in one embodiment of the present invention, the mobile integrated radio receiver/laser detector (RR_LD) 14 further comprises: the radio receiver 48 configured to receive a first set of measurement data from the second plurality of external radio signals, the pseudolite receiver 50 configured to receive a second set of measurement data from at least one internal radio signal broadcasted by the stationary radio transceiver 18 by using the second wireless link 38, the laser detector 52 configured to detect at least one laser beam 40 (and/or 41) generated by the stationary laser transmitter 16 in order to receive a third set of measurement data, and the weighting/navigational processor 54 configured to assign different weights to different sets of measurement data based on a measurement algorithm.

EXAMPLE

The measurement algorithm takes into account a plurality of measurement site parameters selected from the group consisting of: {topology of the site; whether conditions at the site; and visibility of at least one laser beam at the site}. (A) If topology of the site is such that there is no clear view of the sky, the set of measurements based on the external satellite radio signals has a low priority and is assigned the lowest weighting factor.(B) If whether conditions at the site are such that the visibility of at least one laser beam at the site is good, the set of measurements based on the detected laser data should be assigned the highest weighting factor. (C) If whether conditions at the site are such that the visibility of at least one laser beam at the site is bad, the set of measurements based on the detected laser data should be assigned the lowest weighting factor.

FIG. 2 illustrates a radio and light based 3-D positioning system 80 of the present invention comprising: the stationary integrated radio transmitter/laser transmitter (RT_LT) 82 positioned in the location with known coordinates 84 and at least one mobile integrated radio receiver/laser detector (RR_LD) 81.

In one embodiment of the present invention, the stationary integrated radio transmitter/laser transmitter (RT_LT) 82 is configured to broadcast at least one internal radio signal, and is configured to broadcast at least one laser beam 94 (and/or 96). (Please, see the full discussion below).

In one embodiment of the present invention, at least one mobile integrated radio receiver/laser detector (RR_LD) 81 is configured to receive a plurality of external radio signals, is configured to receive at least one internal radio signal broadcasted by the stationary integrated RT_LT 82, is configured to detect at least one laser beam 94 (and/or 96) generated by the integrated RT_LT 82, and is configured to determine its 3-D position coordinates based on a set of data selected from the group consisting of: {the plurality of received external radio signals; at least one received internal radio signal; and at least one detected laser beam}. (Please, see the full discussion below).

More specifically, in one embodiment of the present invention, the stationary integrated radio transceiver/laser transmitter (RT_LT) 82 further comprises the pseudolite transmitter 90 and the laser transmitter 88 integrated with the pseudolite transmitter 90. The pseudolite transmitter 90 further comprises the stationary radio antenna 92, wherein a distance between a phase center of the stationary radio antenna 92 and the laser transmitter 88 is known and fixed.

In one embodiment of the present invention, the laser transmitter 88 further comprises a plane laser transmitter configured to generate a reference laser beam 94 providing a high accuracy vertical coordinate.

In another embodiment of the present invention, the laser transmitter 88 further comprises a fan laser transmitter configured to generate at least one rotating fan-shaped laser beam 94 (and/or 96).

Referring still to FIG. 2, in one embodiment of the present invention, the mobile integrated radio receiver/laser detector (RR_LD) 81 further comprises a radio positioning system receiver 102 and a laser detector 106 integrated with the radio positioning system receiver 102.

In one embodiment of the present invention, the radio positioning system receiver 102 is configured to receive a plurality of external radio signals broadcasted by at least one radio source selected from the group consisting of: {GPS; GLONASS; combined GPS/GLONASS; GALILEO; Global Navigational Satellite System (GNSS); and a pseudolite transmitter}. In this embodiment, the navigational processor 108 is configured to determine the 3-D position coordinates of the mobile integrated radio receiver/laser detector (RR_LD) 81 based on the plurality of received external radio signals.

In one embodiment, the system of the present invention 80 further comprises a wireless link 98 configured to connect the mobile integrated radio receiver/laser detector (RR_LD 81 with the stationary integrated radio transmitter/ laser transmitter (RT_LT) 82. The wireless communication link is selected from the group consisting of:{a cellular link; a radio; a private radio band; a SiteNet 900 private radio network; a wireless Internet; a satellite wireless communication link; and an optical communication link}.

Referring still to FIG. 2, in one embodiment of the present invention, the mobile integrated radio receiver/laser detector (RR_LD) 81 further comprises a pseudolite receiver 104 configured to receive at least one internal radio signal broadcasted by the stationary radio transmitter 90 by using the antenna 92 and the wireless link 98. In this embodiment of the present invention, the mobile integrated radio receiver/laser detector (RR_LD) 81 is configured to determine its 3-D position coordinates based on at least one received internal radio signal by using the navigational processor 108.

Referring still to FIG. 2, in one embodiment of the present invention, the mobile integrated radio receiver/laser detector (RR_LD) 81 further comprises the radio receiver 102 configured to receive the plurality of external radio signals by using the radio antenna 118, and the laser detector 106 configured to detect at least one laser beam 94 (and/or 96) generated by the stationary laser transmitter 88. In this embodiment of the present invention, the integrated radio receiver/laser detector (RR_LD) 81 is configured to determine its 3-D position coordinates at the first (meter or centimeter) level of accuracy based on the plurality of received external radio signals, and is configured to determine its elevation at the second (millimeter) level of accuracy based on at least one detected laser beam 94 (and/or 96) by using the navigational processor 108.

In one embodiment of the present invention, the mobile integrated radio receiver/laser detector (RR_LD) 81 further comprises the pseudolite receiver 104 configured to receive at least one internal radio signal broadcasted by the stationary integrated radio transmitter 90 by using the wireless link 98 and the antenna 92, and the laser detector 106 configured to detect at least one laser beam 94 (and/or 96) generated by the stationary laser transmitter 88. In this embodiment of the present invention, the mobile integrated radio receiver/laser detector (RR_LD) 81 is configured to determine its position coordinates at the first (centimeter or meter) level of accuracy based on at least one internal radio signal broadcasted by the stationary integrated radio transmitter 90, and is configured to determine its elevation at the second (millimeter) level of accuracy based on at least one detected laser beam 94 (and/or 96) by using the navigational processor 108.

Referring still to FIG. 2, in one embodiment of the present invention, the mobile integrated radio receiver/laser detector (RR_LD) 81 further comprises: the radio receiver 102 configured to receive the plurality of external radio signals, the pseudolite receiver 104 configured to receive at least one internal radio signal broadcasted by the stationary integrated radio transmitter 90 by using the wireless link 98, and the laser detector 106 configured to detect at least one laser beam 94 (and/or 96) generated by the stationary laser transmitter 88. In this embodiment of the present invention, the mobile integrated radio receiver/laser detector (RR_LD) 81 is configured to determine its 3-D position coordinates at the first (centimeter or meter) level of accuracy based on at least one internal radio signal broadcasted by the stationary integrated radio transmitter/laser transmitter (RTR_LT) 82 and based on the plurality of received external radio signals by using the navigational processor 108. In this embodiment of the present invention, the mobile integrated radio receiver/laser detector (RR_LD) 81 is configured to determine its elevation at the second (millimeter) level of accuracy based on at least one detected laser beam 94 (and/or 96) by using the navigational processor 108.

Referring still to FIG. 2, in one embodiment of the present invention, the mobile integrated radio receiver/laser detector (RR_LD) 81 further comprises the radio receiver 102 configured to receive a first set of measurement data from the plurality of external radio signals, the pseudolite receiver 104 configured to receive a second set of measurement data from at least one internal radio signal broadcasted by the stationary integrated radio transmitter 90 by using the wireless link 98, the laser detector 106 configured to detect at least one laser beam 94 (and/or 96) generated by the stationary laser transmitter 88 in order to receive a third set of measurement data, and the weighting/navigational processor 108 configured to assign different weights to different sets of measurement data based on the measurement algorithm.

In one embodiment of the present invention, the measurement algorithm is optimized to take into account at least one measurement site parameter at the time of measurement, wherein each measurement site parameter is selected from the group consisting of: {topology of the site; whether conditions at the site; and visibility of at least one laser beam at the site}.

In one embodiment, FIG. 3 shows a radio and light based 3-D positioning system 140 of the present invention comprising: a stationary radio transmitter 156 positioned in a first location with known coordinates 156; a stationary laser transmitter 150 positioned in a second location with known coordinates 152; and at least one mobile integrated radio receiver/laser detector (RR_LD) 180.

In one embodiment of the present invention, the stationary radio transmitter 154 is configured to broadcast at least one internal radio signal, whereas the stationary laser transmitter 150 is configured to broadcast at least one laser beam. In this embodiment of the present invention, the mobile integrated radio receiver/laser detector (RR_LD) 180 is configured to receive a plurality of external radio signals, is configured to receive at least one internal radio signal broadcasted by the stationary radio transmitter, is configured to detect at least one laser beam generated by the stationary laser transmitter, and is configured to determine its 3-D position coordinates based on a set of data selected from the group consisting of: {the plurality of received external radio signals; at least one received internal radio signal; and at least one detected laser beam}.(Please, see the discussion below).

In one embodiment of the present invention, the stationary radio transmitter 154 positioned in the first location with known coordinates 156 further comprises a pseudolite transmitter.

In one embodiment of the present invention, the stationary laser transmitter 150 positioned in the second location with known coordinates 152 further comprises a plane laser transmitter configured to generate a reference laser beam providing a high accuracy vertical coordinate. In another embodiment of the present invention, the stationary laser transmitter 150 positioned in the second location with known coordinates 152 further comprises a fan laser transmitter configured to generate at least one rotating fan-shaped laser beam 172 (and or 174).

In one embodiment of the present invention, at least one mobile integrated radio receiver/laser detector (RR_LD) 180 further comprises a radio positioning system receiver 166 (168) and a laser detector 170 integrated with the radio positioning system receive 166. The radio positioning system receiver 166 (168) further comprises a radio antenna 164 (162), wherein the distance between a phase center of the radio antenna 164 (162) and the laser detector 170 is known and fixed.

In one embodiment of the present invention, the radio positioning system receiver 166 (168) is configured to receive a plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

In one embodiment, the system of the present invention further comprises: a wireless link 160 configured to connect the mobile integrated radio receiver/laser detector (RR_LD) 180 with the stationary radio transmitter 154. The wireless communication link is selected from the group consisting of: {a cellular link; a radio; a private radio band; a SiteNet 900 private radio network; a wireless Internet; a satellite wireless communication link; and an optical communication link}.

Referring still to FIG. 3, more specifically, in one embodiment of the present invention, the mobile integrated radio receiver/laser detector (RR_LD) 180 further comprises the pseudolite receiver 168 configured to receive at least one internal radio signal broadcasted by the stationary radio transmitter 154 by using the wireless link 160, and configured to determine its 3-D position coordinates based on at least one received internal radio signal by using the navigational processor 176.

Referring still to FIG. 3, more specifically, in one embodiment of the present invention, the mobile integrated radio receiver/laser detector (RR_LD) 180 further comprises: the radio receiver 166 configured to receive the plurality of external radio signals transmitted by at least four satellite (or radio) sources 142, 144, 146, and 148, and the laser detector 170 configured to detect at least one laser beam 172 (and/or 174) generated by the stationary laser transmitter 150. In this embodiment of the present invention, the integrated radio receiver/laser detector (RR_LD) 180 is configured to determine its 3-D position coordinates at the first (meter or centimeter) level of accuracy based on the plurality of received external radio signals, and is configured to determine its elevation at the second (millimeter) level of accuracy based on at least one detected laser beam 172 (and/or 174) by using by using the navigational processor 176.

In one embodiment of the present invention, the mobile integrated radio receiver/laser detector (RR_LD) 180 further comprises: the pseudolite receiver 168 configured to receive at least one internal radio signal broadcasted by the stationary radio transmitter 154 by using the wireless link 160, and the laser detector 170 configured to detect at least one laser beam 172 (and/or 174) generated by the stationary laser transmitter 150. In this embodiment of the present invention, the mobile integrated radio receiver/laser detector (RR_LD) 180 is configured to determine its position coordinates at the first (meter or centimeter) level of accuracy based on at least one internal radio signal broadcasted by the stationary radio transmitter 154, and is configured to determine its elevation at the second (millimeter) level of accuracy based on at least one detected laser beam 172 (and/or 175) by using by using the navigational processor 176.

In one embodiment of the present invention, the mobile integrated radio receiver/laser detector (RR_LD) 180 further comprises the radio receiver 166 configured to receive the plurality of external radio signals, the pseudolite receiver 168 configured to receive at least one internal radio signal broadcasted by the stationary radio transmitter 154 by using the wireless link 160, and the laser detector 170 configured to detect at least one laser beam 172 (and/or 174) generated by the stationary laser transmitter 150. In this embodiment of the present invention, the mobile integrated radio receiver/laser detector (RR_LD)180 is configured to determine its 3-D position coordinates at the first (centimeter or meter) level of accuracy based on at least one internal radio signal broadcasted by the stationary radio transmitter 154 and based on the plurality of received external radio signals broadcasted by at least one satellite (and/or radio) source, and is configured to determine its elevation at the second (millimeter) level of accuracy based on at least one detected laser beam 172 (and/or 174) by using the navigational processor 176.

Referring still to FIG. 3, in one embodiment of the present invention, the mobile integrated radio receiver/laser detector (RR_LD) 180 further comprises: the radio receiver 166 configured to receive a first set of measurement data from the plurality of external radio signals, the pseudolite receiver 168 configured to receive a second set of measurement data from at least one internal radio signal broadcasted by the stationary radio transmitter 154 by using the wireless link 160, the laser detector 170 configured to detect at least one laser beam 172 (and/or 174) generated by the stationary laser transmitter 150 in order to receive a third set of measurement data, and the weighting/navigational processor configured to assign different weights to different sets of measurement data based on a measurement algorithm. In one embodiment of the present invention, the measurement algorithm is optimized to take into account at least one measurement site parameter at the time of measurement, wherein each measurement site parameter is selected from the group consisting of: {topology of the site; whether conditions at the site; and visibility of at least one laser beam at the site}.

Another aspect of the present invention is directed to the method of determining the position coordinates of a mobile user 14 by using the stationary integrated self-positioning radio transceiver/laser transmitter (RTR_LT) 12 of FIG. 1.

In this embodiment, the method of the present invention comprises the following steps (not shown): (A) providing a radio and light based 3-D positioning system 10 comprising the stationary integrated self-positioning radio transceiver/laser transmitter (RTR_LT) 12 and the mobile user comprising a mobile integrated radio receiver/laser detector (RR_LD) 14; (B) receiving a first plurality of external radio signals by using the stationary integrated self-positioning radio transceiver/laser transmitter (RTR_LT);(C) determining position coordinates of the stationary integrated self-positioning radio transceiver/laser transmitter (RTR_LT) based on the first plurality of received external radio signals; (D) broadcasting at least one internal radio signal and broadcasting at least one laser beam by using the stationary integrated self-positioning radio transceiver/laser transmitter (RTR_LT); (E) receiving a second plurality of external radio signals, receiving at least one internal radio signal broadcasted by the stationary integrated self-positioning RTR_LT, and detecting the laser beam generated by the self-positioning integrated RTR_LT by using the mobile integrated radio receiver/laser detector (RR_LD); and (F) determining the 3-D position coordinates of the mobile integrated radio receiver/laser detector (RR_LD) based on a set of data selected from the group consisting of: {the second plurality of received external radio signals; at least one received internal radio signal; and at least one detected laser beam}.

In one embodiment of the present invention, the step (B) further comprises the step (B1) of receiving the first plurality of external radio signals broadcasted by at least one radio source selected from the group consisting of: {GPS; GLONASS; combined GPS/GLONASS; GALILEO; Global Navigational Satellite System (GNSS); and a pseudolite transmitter}.

In one embodiment of the present invention, the step (B) further comprises the step (B2) of receiving a set of differential corrections data broadcasted by at least one source selected from the group consisting of: {a Base Station, an RTK Base Station; a Virtual Base Station (VBS); and a pseudolite transmitter}.

In one embodiment of the present invention, the step (D) further comprises the step (D1) of generating a reference laser beam providing a high accuracy vertical coordinate by using a plane laser transmitter. In another embodiment of the present invention, the step (D) further comprises the step (D2) of generating at least one rotating fan-shaped laser beam by using a fan laser transmitter.

In one embodiment of the present invention, the step (E) further comprises the step (E1) of receiving the second plurality of external radio signals broadcasted by at least one radio source selected from the group consisting of: {GPS; GLONASS; combined GPS/GLONASS; GALILEO; Global Navigational Satellite System (GNSS); and a pseudolite transmitter}. In one embodiment of the present invention, the step (E) further comprises the step (E2) of detecting at least one laser beam generated by the stationary integrated self-positioning radio transceiver/laser transmitter (RTR_LT).

In one embodiment of the present invention, the step (F) further comprises the steps: (F1) of determining the 3-D position coordinates of the mobile integrated radio receiver/laser detector (RR_LD) at the first level of accuracy based on the second plurality of received external radio signals, and (F2) of determining the elevation coordinate of the mobile integrated radio receiver/laser detector (RR_LD) at the second level of accuracy based on at least one detected laser beam. In one embodiment of the present invention, the step (F) further comprises the steps: (F3) of determining the 3-D position coordinates of the mobile integrated radio receiver/laser detector (RR_LD) at the first level of accuracy based on at least one internal radio signal broadcasted by the stationary integrated self-positioning radio transceiver/laser transmitter (RTR_LT) and based on the second plurality of received external radio signals, and (F4) of determining the elevation coordinate of the mobile integrated radio receiver/laser detector (RR_LD) at the second level of accuracy based on at least one detected laser beam. In one embodiment of the present invention, the step (F) further comprises the step (F5) of assigning different weights to different sets of measurement data based on a measurement algorithm by using a weighting processor; wherein the measurement algorithm is optimized to take into account at least one measurement site parameter at the time of measurement; and wherein each measurement site parameter is selected from the group consisting of: {topology of the site; whether conditions at the site; and visibility of at least one laser beam at the site}.

One more aspect of the present invention is directed to the method of tracking at least one mobile unit utilizing the stationary integrated self-positioning radio transceiver/laser transmitter (RTR_LT) 12 (of FIG. 1), wherein at least one such mobile user comprises the mobile integrated radio receiver/laser detector (RR_LD) 14 (of FIG. 1).

In one embodiment, the tracking method of the present invention comprises the following steps (not shown): (A) determining position coordinates of the stationary integrated self-positioning radio transceiver/laser transmitter (RTR_LT) (12 of FIG. 1) based on a first plurality of external radio signals; (B) substantially continuously broadcasting at least one internal radio signal and broadcasting at least one laser beam by using the stationary integrated self-positioning radio transceiver/laser transmitter (RTR_LT) (12 of FIG. 1); (C) receiving a second plurality of external radio signals, receiving at least one internal radio signal broadcasted by the stationary integrated self-positioning RTR_LT, and detecting the laser beam generated by the self-positioning integrated RTR_LT by using at least one mobile integrated radio receiver/laser detector (RR_LD) (14 of FIG. 1); (D) determining the 3-D position coordinates of at least one mobile integrated radio receiver/laser detector (RR_LD) (14 of FIG. 1) based on a set of data selected from the group consisting of: {the second plurality of received external radio signals; at least one received internal radio signal; and at least one detected laser beam}; and (E) sending back to the stationary integrated self-positioning RTR_LT laser transmitter the 3-D position coordinates measurements of at least one mobile integrated radio receiver/laser detector (RR_LD). In one embodiment, wherein the stationary integrated self-positioning radio transceiver/laser transmitter (RTR_LT) further includes a display block (not shown), the tracking method of the present invention further comprises the step: (F) of displaying the 3-D position coordinates measurements of at least one mobile integrated radio receiver/laser detector (RR_LD).

Yet, another aspect of the present invention is directed to a method of method of determining the position coordinates of a mobile user comprising the steps of (not shown): (A) providing a radio and light based 3-D positioning system 80 of FIG. 2 comprising a stationary integrated radio transmitter/laser transmitter (RT_LT) 82 positioned in the known location 84 and the mobile user comprising a mobile integrated radio receiver/laser detector (RR_LD) 81; (B) broadcasting at least one internal radio signal and broadcasting at least one laser beam by using the stationary integrated radio transmitter/laser transmitter (RT_LT); (C) receiving a plurality of external radio signals, receiving at least one internal radio signal broadcasted by the stationary integrated RT_LT, and detecting the laser beam generated by the stationary integrated RT_LT by using the mobile integrated radio receiver/laser detector (RR_LD); and (D) determining the 3-D position coordinates of the mobile integrated radio receiver/laser detector (RR_LD) based on a set of data selected from the group consisting of: {the plurality of received external radio signals; at least one received internal radio signal; and at least one detected laser beam}.

In one embodiment of the present invention, the step (C) further comprises the step(C2) of detecting at least one laser beam generated by the stationary integrated radio transmitter/laser transmitter (RT_LT).

In one embodiment of the present invention, the step (D) further comprises the steps: (D1) of determining the 3-D position coordinates of the mobile integrated radio receiver/laser detector (RR_LD) at the first level of accuracy based on the plurality of received external radio signals, and (D2) of determining the elevation coordinate of the mobile integrated radio receiver/laser detector (RR_LD) at the second level of accuracy based on at least one detected laser beam.

In one embodiment of the present invention, the step (D) further comprises the steps: (D3) of determining the 3-D position coordinates of the mobile integrated radio receiver/laser detector (RR_LD) at the first level of accuracy based on at least one internal radio signal broadcasted by the stationary integrated radio transmitter/laser transmitter (RT_LT) and based on the plurality of received external radio signals, and (D4) of determining the elevation coordinate of the mobile integrated radio receiver/laser detector (RR_LD) at the second level of accuracy based on at least one detected laser beam.

In one embodiment, the step (D) further comprises the step of (D5) of assigning different weights to different sets of measurement data based on a measurement algorithm by using a weighting processor; wherein the measurement algorithm is optimized to take into account at least one measurement site parameter at the time of measurement; and wherein each measurement site parameter is selected from the group consisting of: {topology of the site; whether conditions at the site; and visibility of at least one laser beam at the site}.

Yet, one more aspect of the present invention is directed to a method of tracking at least one mobile unit utilizing a stationary integrated radio transmitter/laser transmitter (RT_LT) 82 (of FIG. 2) positioned in a known location, wherein at least one mobile user comprises a mobile integrated radio receiver/laser detector (RR_LD) (81 of FIG. 2). In this embodiment, the tracking method of the present invention comprises the following steps (not shown): (A) substantially continuously broadcasting at least one internal radio signal and broadcasting at least one laser beam by using the stationary integrated radio transmitter/laser transmitter (RT_LT); (B) receiving a plurality of external radio signals, receiving at least one internal radio signal broadcasted by the stationary integrated RT_LT, and detecting the laser beam generated by the stationary integrated RT_LT by using at least one mobile integrated radio receiver/laser detector (RR_LD); (C) determining the 3-D position coordinates of at least one mobile integrated radio receiver/laser detector (RR_LD) based on a set of data selected from the group consisting of: {the second plurality of received external radio signals; at least one received internal radio signal; and at least one detected laser beam}; (D) sending back to the stationary integrated RT_LT the 3-D position coordinates measurements of at least one mobile integrated radio receiver/laser detector (RR_LD), and (optionally) (E) displaying the 3-D position coordinates measurements of at least one mobile integrated radio receiver/laser detector (RR_LD), wherein the stationary integrated radio transmitter/laser transmitter (RT_LT) further includes a display block (not shown).

Yet, one additional aspect of the present invention is directed to a method of determining the position coordinates of a mobile user (180 of FIG. 3) by utilizing the stationary radio transmitter (154 of FIG. 3) positioned at the first location (156 of FIG. 3) with known coordinates, and by utilizing the stationary laser transmitter (150 of FIG. 3) positioned at the second location (152 of FIG. 3) with known coordinates. In this embodiment, the method of the present invention comprises the following steps (not shown): (A) providing a stationary radio transmitter positioned at a first location with known coordinates; providing a stationary laser transmitter positioned at a second location with known coordinates; and providing the mobile user comprising a mobile integrated radio receiver/laser detector (RR_LD); (B) broadcasting at least one internal radio signal by using the stationary radio transmitter positioned at the first location with known coordinates; (C) broadcasting at least one laser beam by using the stationary laser transmitter positioned at the second location with known coordinates; (D) receiving a plurality of external radio signals, receiving at least one internal radio signal broadcasted by the stationary radio transmitter positioned at the first location with known coordinates; and detecting the laser beam generated by the stationary laser transmitter positioned at the second location with known coordinates by using the mobile integrated radio receiver/laser detector (RR_LD); and (E) determining the 3-D position coordinates of the mobile integrated radio receiver/laser detector (RR_LD) based on a set of data selected from the group consisting of: {the plurality of received external radio signals; at least one received internal radio signal; and at least one detected laser beam}.

In one embodiment of the present invention, the step (D) further comprises the step (D2) of detecting at least one laser beam generated by the stationary laser transmitter.

In one embodiment of the present invention, the step (E) further comprises the steps: (E1) of determining the 3-D position coordinates of the mobile integrated radio receiver/laser detector (RR_LD) at the first level of accuracy based on the plurality of received external radio signals; and (E2) determining the elevation coordinate of the mobile integrated radio receiver/laser detector (RR_LD) at the second level of accuracy based on at least one detected laser beam.

In one embodiment of the present invention, the step (E) further comprises the steps: (E3) of determining the 3-D position coordinates of the mobile integrated radio receiver/laser detector (RR_LD) at the first level of accuracy based on at least one internal radio signal broadcasted by the stationary radio transmitter and based on the plurality of received external radio signals, and (E4) of determining the elevation coordinate of the mobile integrated radio receiver/laser detector (RR_LD) at the second level of accuracy based on at least one detected laser beam.

In one embodiment of the present invention, the step (E) further comprises the step (E5) of assigning different weights to different sets of measurement data based on a measurement algorithm by using a weighting processor; wherein the measurement algorithm is optimized to take into account at least one measurement site parameter at the time of measurement; and wherein each measurement site parameter is selected from the group consisting of: {topology of the site; whether conditions at the site; and visibility of at least one laser beam at the site}.

One more additional aspect of the present invention is directed to a method of tracking at least one mobile unit 180 utilizing the stationary radio transmitter (154 of FIG. 3) positioned at the first location with known coordinates (156 of FIG. 3) and utilizing the stationary laser transmitter (150 of FIG. 3) positioned at the second location with known coordinates (152 of FIG. 3), wherein at lest one mobile user comprises the mobile integrated radio receiver/laser detector (RR_LD) (180 of FIG. 3). In this embodiment of the present invention, the method comprises the following steps (not shown): (A) substantially continuously broadcasting at least one internal radio signal by using the stationary radio transmitter positioned at the first location with known coordinates; (B) substantially continuously broadcasting at least one laser beam by using the stationary laser transmitter positioned at the second location with known coordinates; (C) receiving a plurality of external radio signals, receiving at least one internal radio signal broadcasted by the stationary radio transmitter positioned at the first location with known coordinates; and detecting the laser beam generated by the stationary laser transmitter positioned at the second location with known coordinates by using the mobile integrated radio receiver/laser detector (RR_LD); (D) determining the 3-D position coordinates of the mobile integrated radio receiver/laser detector (RR_LD) based on a set of data selected from the group consisting of: {the plurality of received external radio signals; at least one received internal radio signal; and at least one detected laser beam}; (E) sending back to the stationary radio transmitter positioned at the first location with known coordinates and sending back to the stationary laser transmitter positioned at the second location with known coordinates the 3-D position coordinates measurements of at least one mobile integrated radio receiver/laser detector (RR_LD); and (optionally) (F) displaying the 3-D position coordinates measurements of at least one such mobile integrated radio receiver/laser detector (RR_LD), wherein the radio transmitter positioned at the first location with known coordinates includes a first display block (not shown); and wherein the stationary laser transmitter positioned at the second location with known coordinates includes a second display block (not shown).

The foregoing description of specific embodiments of the present invention has been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A radio and light based 3-D positioning system comprising:

a stationary integrated self-positioning radio transceiver/laser transmitter (RTR_LT) configured to receive a first plurality of external radio signals, configured to determine its position coordinates based on said first plurality of received external radio signals, configured to broadcast at least one internal radio signal; and configured to broadcast at least one laser beam; and at least one mobile integrated radio receiver/laser detector (RR_LD) configured to receive a second plurality of external radio signals, configured to receive at least one said internal radio signal broadcasted by said stationary integrated self-positioning RTR_LT, configured to detect at least one said laser beam generated by said self-positioning integrated RTR_LT; and configured to determine its 3-D position coordinates based on a set of data selected from the group consisting of: said second plurality of received external radio signals; said at least one received internal radio signal; and said at least one detected laser beam.

2. The system of claim 1, wherein said stationary integrated self-positioning radio transceiver/laser transmitter (RTR_LT) further comprises:
a pseudolite transceiver configured to receive said first plurality of external radio signals broadcasted by at least one radio source selected from the group consisting of: GPS; GLONASS; combined GPS/GLONASS; GALILEO; Global Navigational Satellite System (GNSS); and a pseudolite transmitter; and
a laser transmitter integrated with said pseudolite transceiver.

3. The system of claim 2, wherein said pseudolite transceiver further comprises:
a stationary radio antenna; wherein a distance between a phase center of said stationary radio antenna and said laser transmitter is known and fixed.

4. The system of claim 2, wherein said laser transmitter further comprises:
a plane laser transmitter configured to generate a reference laser beam providing a high accuracy vertical coordinate.

5. The system of claim 2, wherein said laser transmitter further comprises:
a fan laser transmitter configured to generate at least one rotating fan-shaped laser beam.

6. The system of claim 1, wherein said stationary integrated self-positioning radio transceiver/laser transmitter (RTR_LT) further comprises:
a differential pseudolite transceiver configured to receive said first plurality of external radio signals broadcasted by said at least one radio source selected from the group consisting of: GPS; GLONASS; combined GPS/GLONASS; GALILEO; Global Navigational Satellite System (GNSS); and a pseudolite transmitter; and configured to receive a set of differential corrections data broadcasted by at least one source selected from the group consisting of: a Base Station, an RTK Base Station; a Virtual Base Station (VBS); and a pseudolite transmitter; and
a laser transmitter;
wherein said differential pseudolite transceiver is configured to utilize said first plurality of external radio signals and said set of differential corrections data to obtain precise coordinate measurements of said differential pseudolite transceiver.

7. The system of claim 6 further comprising:
a first wireless communication link configured to connect said differential pseudolite transceiver to said source of differential correction data; and wherein said first wireless communication link is selected from the group consisting of: a cellular link; a radio; a private radio band; a SiteNet 900 private radio network; a wireless Internet; a satellite wireless communication link; and an optical communication link.

8. The system of claim 1, wherein at least one said mobile integrated radio receiver/laser detector (RR_LD) further comprises:
a radio positioning system receiver configured to receive said second plurality of external radio signals broadcasted by at least one radio source selected from the group consisting of: GPS; GLONASS; combined GPS/GLONASS; GALILEO; Global Navigational Satellite System (GNSS); and
a pseudolite transmitter; and
a laser detector integrated with said radio positioning system receiver;
wherein said radio positioning system receiver is configured to determine its 3-D position coordinates based on said second plurality of received external radio signals.

9. The system of claim 1 further comprising:
a second wireless link configured to connect said mobile integrated radio receiver/laser detector (RR_LD with said stationary integrated self-positioning radio transceiver/laser transmitter (RTR_LT);
and wherein said second wireless communication link is selected from the group consisting of: a cellular link; a radio; a private radio band; a SiteNet 900 private radio network; a wireless Internet; a satellite wireless communication link; and an optical communication link.

10. The system of claim 9, wherein said at least one mobile integrated radio receiver/laser detector (RR_LD) further comprises:
a pseudolite receiver configured to receive at least one said internal radio signal broadcasted by said stationary integrated self-positioning radio transceiver/laser transmitter (RTR_LT) by using said second wireless link, and configured to determine its 3-D position coordinates based on said at least one received internal radio signal.

11. The system of claim 1, wherein said at least one mobile integrated radio receiver/laser detector (RR_LD) further comprises:
a radio receiver configured to receive said second plurality of external radio signals; and
a laser detector configured to detect at least one said laser beam generated by said stationary integrated self-positioning radio transceiver/laser transmitter (RTR_LT);
wherein said integrated radio receiver/laser detector (RR_LD) is configured to determine its 3-D position coordinates at a first level of accuracy based on said second plurality of received external radio signals;
wherein said integrated radio receiver/laser detector (RR_LD) is configured to determine its elevation at a second level of accuracy based on said at least one detected laser beam;
and wherein a set of measurements determined at said second level of accuracy is more accurate than said set of measurements determined at said first level of accuracy.

12. The system of claim 11, wherein said radio receiver further comprises:
a radio antenna; wherein the distance between a phase center of said radio antenna and said laser detector is known and fixed.

13. The system of claim 1, wherein said at least one mobile integrated radio receiver/laser detector (RR_LD) further comprises:
a pseudolite receiver configured to receive at least one said internal radio signal broadcasted by said stationary integrated self-positioning radio transceiver/laser transmitter (RTR_LT) by using said second wireless link; and
a laser detector configured to detect at least one said laser beam generated by said stationary integrated self-positioning radio transceiver/laser transmitter (RTR_LT);
wherein said at least one mobile integrated radio receiver/laser detector (RR_LD) is configured to determine its position coordinates at said first level of accuracy based on said at least one internal radio signal broadcasted by said stationary integrated self-positioning radio transceiver/laser transmitter (RTR_LT);

and wherein said at least one mobile integrated radio receiver/laser detector (RR_LD) is configured to determine its elevation at said second level of accuracy based on said at least one detected laser beam;

and wherein a set of measurements determined at said second level of accuracy is more accurate than said set of measurements determined at said first level of accuracy.

14. The system of claim 1, wherein said at least one mobile integrated radio receiver/laser detector (RR_LD) further comprises:
a radio receiver configured to receive said second plurality of external radio signals;
a pseudolite receiver configured to receive at least one said internal radio signal broadcasted by said stationary integrated self-positioning radio transceiver/laser transmitter (RTR_LT) by using said second wireless link; and
a laser detector configured to detect at least one said laser beam generated by said stationary integrated self-positioning radio transceiver/laser transmitter (RTR_LT);
wherein said at least one mobile integrated radio receiver/laser detector (RR_LD) is configured to determine its 3-D position coordinates at said first level of accuracy based on said at least one internal radio signal broadcasted by said stationary integrated self-positioning radio transceiver/laser transmitter (RTR_LT) and based on said second plurality of received external radio signals;
and wherein said at least one mobile integrated radio receiver/laser detector (RR_LD) is configured to determine its elevation at said second level of accuracy based on said at least one detected laser beam;
and wherein said second level of accuracy is higher than said first level of accuracy.

15. The system of claim 1, wherein said at least one mobile integrated radio receiver/laser detector (RR_LD) further comprises:
a radio receiver configured to receive a first set of measurement data from said second plurality of external radio signals;
a pseudolite receiver configured to receive a second set of measurement data from at least one said internal radio signal broadcasted by said stationary integrated self-positioning radio transceiver/laser transmitter (RTR_LT) by using said second wireless link;
a laser detector configured to detect at least one said laser beam generated by said stationary integrated self-positioning radio transceiver/laser transmitter (RTR_LT) in order to receive a third set of measurement data; and
a weighting processor;
wherein said weighting processor is configured to assign different weights to different sets of measurement data based on a measurement algorithm.

16. The system of claim 1, wherein said measurement algorithm is optimized to take into account at least one measurement site parameter at the time of measurement; and wherein each said measurement site parameter is selected from the group consisting of: topology of said site; whether conditions at said site; and visibility of at least one said laser beam at said site.

17. A radio and light based 3-D positioning system comprising:

a stationary integrated radio transmitter/laser transmitter (RT_LT) positioned in a location with known coordinates; configured to broadcast at least one internal radio signal; and configured to broadcast at least one laser beam; and
at least one mobile integrated radio receiver/laser detector (RR_LD) configured to receive a plurality of external radio signals, configured to receive at least one said internal radio signal broadcasted by said stationary integrated RT_LT; configured to detect at least one said laser beam generated by said integrated RT_LT; and configured to determine its 3-D position coordinates based on a set of data selected from the group consisting of: said plurality of received external radio signals; said at least one received internal radio signal; and said at least one detected laser beam.

18. The system of claim 17, wherein said stationary integrated radio transceiver/laser transmitter (RT_LT) further comprises:
a pseudolite transmitter; and
a laser transmitter integrated with said pseudolite transmitter.

19. The system of claim 18, wherein said pseudolite transmitter further comprises:
a stationary radio antenna; wherein a distance between a phase center of said stationary radio antenna and said laser transmitter is known and fixed.

20. The system of claim 18, wherein said laser transmitter further comprises:
a plane laser transmitter configured to generate a reference laser beam providing a high accuracy vertical coordinate.

21. The system of claim 18, wherein said laser transmitter further comprises:
a fan laser transmitter configured to generate at least one rotating fan-shaped laser beam.

22. The system of claim 17, wherein at least one said mobile integrated radio receiver/laser detector (RR_LD) further comprises:
a radio positioning system receiver configured to receive a plurality of external radio signals broadcasted by at least one radio source selected from the group consisting of: GPS; GLONASS; combined GPS/GLONASS; GALILEO; Global Navigational Satellite System (GNSS); and a pseudolite transmitter; and
a laser detector integrated with said radio positioning system receiver;
wherein said radio positioning system receiver is configured to determine its 3-D position coordinates based on said plurality of received external radio signals.

23. The system of claim 17 further comprising:
a wireless link configured to connect said mobile integrated radio receiver/laser detector (RR_LD with said stationary integrated radio transmitter/laser transmitter (RT_LT);
and wherein said wireless communication link is selected from the group consisting of: a cellular link; a radio; a private radio band; a SiteNet 900 private radio network; a wireless Internet; a satellite wireless communication link; and an optical communication link.

24. The system of claim 23, wherein said at least one mobile integrated radio receiver/laser detector (RR_LD) further comprises:
a pseudolite receiver configured to receive at least one said internal radio signal broadcasted by said stationary integrated radio transmitter/laser transmitter (RT_LT) by using said wireless link, and configured to determine its 3-D position coordinates based on said at least one received internal radio signal.

25. The system of claim 17, wherein said at least one mobile integrated radio receiver/laser detector (RR_LD) further comprises:
   a radio receiver configured to receive said plurality of external radio signals; and
   a laser detector configured to detect at least one said laser beam generated by said stationary integrated radio transmitter/laser transmitter (RT_LT);
   wherein said integrated radio receiver/laser detector (RR_LD) is configured to determine its 3-D position coordinates at a first level of accuracy based on said plurality of received external radio signals;
   wherein said integrated radio receiver/laser detector (RR_LD) is configured to determine its elevation at a second level of accuracy based on said at least one detected laser beam;
   and wherein a set of measurements determined at said second level of accuracy is more accurate than said set of measurements determined at said first level of accuracy.

26. The system of claim 25, wherein said radio receiver further comprises:
   a radio antenna; wherein the distance between a phase center of said radio antenna and said laser detector is known and fixed.

27. The system of claim 17, wherein said at least one mobile integrated radio receiver/laser detector (RR_LD) further comprises:
   a pseudolite receiver configured to receive at least one said internal radio signal broadcasted by said stationary integrated radio transmitter/laser transmitter (RT_LT) by using said wireless link; and
   a laser detector configured to detect at least one said laser beam generated by said stationary integrated radio transmitter/laser transmitter (RT_LT);
   wherein said at least one mobile integrated radio receiver/laser detector (RR_LD) is configured to determine its position coordinates at said first level of accuracy based on said at least one internal radio signal broadcasted by said stationary integrated radio transmitter/laser transmitter (RT_LT);
   and wherein said at least one mobile integrated radio receiver/laser detector (RR_LD) is configured to determine its elevation at said second level of accuracy based on said at least one detected laser beam;
   and wherein a set of measurements determined at said second level of accuracy is more accurate than said set of measurements determined at said first level of accuracy.

28. The system of claim 17, wherein said at least one mobile integrated radio receiver/laser detector (RR_LD) further comprises:
   a radio receiver configured to receive said plurality of external radio signals;
   a pseudolite receiver configured to receive at least one said internal radio signal broadcasted by said stationary integrated radio transmitter/laser transmitter (RT_LT) by using said wireless link; and
   a laser detector configured to detect at least one said laser beam generated by said stationary integrated radio transmitter/laser transmitter (RT_LT);
   wherein said at least one mobile integrated radio receiver/laser detector (RR_LD) is configured to determine its 3-D position coordinates at said first level of accuracy based on said at least one internal radio signal broadcasted by said stationary integrated radio transmitter/laser transmitter (RTR_LT) and based on said plurality of received external radio signals;
   and wherein said at least one mobile integrated radio receiver/laser detector (RR_LD) is configured to determine its elevation at said second level of accuracy based on said at least one detected laser beam;
   and wherein said second level of accuracy is higher than said first level of accuracy.

29. The system of claim 17, wherein said at least one mobile integrated radio receiver/laser detector (RR_LD) further comprises:
   a radio receiver configured to receive a first set of measurement data from said plurality of external radio signals;
   a pseudolite receiver configured to receive a second set of measurement data from at least one said internal radio signal broadcasted by said stationary integrated radio transmitter/laser transmitter (RT_LT) by using said wireless link;
   a laser detector configured to detect at least one said laser beam generated by said stationary integrated radio transmitter/laser transmitter (RT_LT) in order to receive a third set of measurement data; and
   a weighting processor;
   wherein said weighting processor is configured to assign different weights to different sets of measurement data based on a measurement algorithm.

30. The system of claim 17, wherein said measurement algorithm is optimized to take into account at least one measurement site parameter at the time of measurement; and wherein each said measurement site parameter is selected from the group consisting of: topology of said site; whether conditions at said site; and visibility of at least one said laser beam at said site.

31. A radio and light based 3-D positioning system comprising:
   a stationary radio transmitter positioned in a first location with known coordinates; said stationary radio transmitter configured to broadcast at least one internal radio signal;
   a stationary laser transmitter positioned in a second location with known coordinates; said stationary laser transmitter configured to broadcast at least one laser beam; and
   at least one mobile integrated radio receiver/laser detector (RR_LD) configured to receive a plurality of external radio signals, configured to receive at least one said internal radio signal broadcasted by said stationary radio transmitter; configured to detect at least one said laser beam generated by said stationary laser transmitter; and configured to determine its 3-D position coordinates based on a set of data selected from the group consisting of: said plurality of received external radio signals; said at least one received internal radio signal; and said at least one detected laser beam.

32. The system of claim 31, wherein said stationary radio transmitter further comprises:
   a pseudolite transmitter.

33. The system of claim 31, wherein said laser transmitter further comprises:
   a plane laser transmitter configured to generate a reference laser beam providing a high accuracy vertical coordinate.

34. The system of claim 31, wherein said laser transmitter further comprises:

a fan laser transmitter configured to generate at least one rotating fan-shaped laser beam.

35. The system of claim 31, wherein at least one said mobile integrated radio receiver/laser detector (RR_LD) further comprises:
a radio positioning system receiver configured to receive a plurality of external radio signals broadcasted by at least one radio source selected from the group consisting of: GPS; GLONASS; combined GPS/GLONASS; GALILEO; Global Navigational Satellite System (GNSS); and a pseudolite transmitter; and
a laser detector integrated with said radio positioning system receiver;
wherein said radio positioning system receiver is configured to determine its 3-D position coordinates based on said plurality of received external radio signals.

36. The system of claim 31 further comprising:
a wireless link configured to connect said mobile integrated radio receiver/laser detector (RR_LD) with said stationary radio transmitter;
and wherein said wireless communication link is selected from the group consisting of: a cellular link; a radio; a private radio band; a SiteNet 900 private radio network; a wireless Internet; a satellite wireless communication link; and an optical communication link.

37. The system of claim 31, wherein said at least one mobile integrated radio receiver/laser detector (RR_LD) further comprises:
a pseudolite receiver configured to receive at least one said internal radio signal broadcasted by said stationary radio transmitter by using said wireless link, and configured to determine its 3-D position coordinates based on said at least one received internal radio signal.

38. The system of claim 31, wherein said at least one mobile integrated radio receiver/laser detector (RR_LD) further comprises:
a radio receiver configured to receive said plurality of external radio signals; and
a laser detector configured to detect at least one said laser beam generated by said stationary laser transmitter;
wherein said integrated radio receiver/laser detector (RR_LD) is configured to determine its 3-D position coordinates at a first level of accuracy based on said plurality of received external radio signals;
wherein said integrated radio receiver/laser detector (RR_LD) is configured to determine its elevation at a second level of accuracy based on said at least one detected laser beam;
and wherein a set of measurements determined at said second level of accuracy is more accurate than said set of measurements determined at said first level of accuracy.

39. The system of claim 38, wherein said radio receiver further comprises:
a radio antenna; wherein the distance between a phase center of said radio antenna and said laser detector is known and fixed.

40. The system of claim 31, wherein said at least one mobile integrated radio receiver/laser detector (RR_LD) further comprises:
a pseudolite receiver configured to receive at least one said internal radio signal broadcasted by said stationary radio transmitter by using said wireless link; and
a laser detector configured to detect at least one said laser beam generated by said stationary laser transmitter;
wherein said at least one mobile integrated radio receiver/laser detector (RR_LD) is configured to determine its position coordinates at said first level of accuracy based on said at least one internal radio signal broadcasted by said stationary radio transmitter;
and wherein said at least one mobile integrated radio receiver/laser detector (RR_LD) is configured to determine its elevation at said second level of accuracy based on said at least one detected laser beam;
and wherein a set of measurements determined at said second level of accuracy is more accurate than said set of measurements determined at said first level of accuracy.

41. The system of claim 31, wherein said at least one mobile integrated radio receiver/laser detector (RR_LD) further comprises:
a radio receiver configured to receive said plurality of external radio signals;
a pseudolite receiver configured to receive at least one said internal radio signal broadcasted by said stationary radio transmitter by using said wireless link; and
a laser detector configured to detect at least one said laser beam generated by said stationary laser transmitter;
wherein said at least one mobile integrated radio receiver/laser detector (RR_LD) is configured to determine its 3-D position coordinates at said first level of accuracy based on said at least one internal radio signal broadcasted by said stationary radio transmitter and based on said plurality of received external radio signals;
and wherein said at least one mobile integrated radio receiver/laser detector (RR_LD) is configured to determine its elevation at said second level of accuracy based on said at least one detected laser beam;
and wherein said second level of accuracy is higher than said first level of accuracy.

42. The system of claim 31, wherein said at least one mobile integrated radio receiver/laser detector (RR_LD) further comprises:
a radio receiver configured to receive a first set of measurement data from said plurality of external radio signals;
a pseudolite receiver configured to receive a second set of measurement data from at least one said internal radio signal broadcasted by said stationary radio transmitter by using said wireless link;
a laser detector configured to detect at least one said laser beam generated by said stationary laser transmitter in order to receive a third set of measurement data; and
a weighting processor;
wherein said weighting processor is configured to assign different weights to different sets of measurement data based on a measurement algorithm.

43. The system of claim 31, wherein said measurement algorithm is optimized to take into account at least one measurement site parameter at the time of measurement; and wherein each said measurement site parameter is selected from the group consisting of: topology of said site; whether conditions at said site; and visibility of at least one said laser beam at said site.

44. A method of determining the position coordinates of a mobile user comprising the steps of:
(A) providing a radio and light based 3-D positioning system comprising a stationary integrated self-positioning radio transceiver/laser transmitter (RTR_LT) and said mobile user comprising a mobile integrated radio receiver/laser detector (RR_LD);
(B) receiving a first plurality of external radio signals by using said stationary integrated self-positioning radio transceiver/laser transmitter (RTR_LT);

(C) determining position coordinates of said stationary integrated self-positioning radio transceiver/laser transmitter (RTR_LT) based on said first plurality of received external radio signals, (D) broadcasting at least one internal radio signal and broadcasting at least one laser beam by using said stationary integrated self-positioning radio transceiver/laser transmitter (RTR_LT);

(E) receiving a second plurality of external radio signals, receiving at least one said internal radio signal broadcasted by said stationary integrated self-positioning RTR_LT, and detecting said laser beam generated by said self-positioning integrated RTR_LT by using said mobile integrated radio receiver/laser detector (RR_LD); and (F) determining the 3-D position coordinates of said mobile integrated radio receiver/laser detector (RR_LD) based on a set of data selected from the group consisting of: said second plurality of received external radio signals; said at least one received internal radio signal; and said at least one detected laser beam.

45. The method of claim 44 further comprising the steps of:

(G) sending back to said stationary integrated self-positioning RTR_LT laser transmitter said 3-D position coordinates measurements of said at least one mobile integrated radio receiver/laser detector (RR_LD); and (H) displaying said 3-D position coordinates measurements of at least one said mobile integrated radio receiver/laser detector (RR_LD), wherein said stationary integrated self-positioning radio transceiver/laser transmitter (RTR_LT) further includes a display block.

46. A method of determining the position coordinates of a mobile user comprising the steps of:

(A) providing a radio and light based 3-D positioning system comprising a stationary integrated radio transmitter/laser transmitter (RT_LT) positioned in a known location and said mobile user comprising a mobile integrated radio receiver/laser detector (RR_LD);

(B) broadcasting at least one internal radio signal and broadcasting at least one laser beam by using said stationary integrated radio transmitter/laser transmitter (RT_LT);

(C) receiving a plurality of external radio signals, receiving at least one said internal radio signal broadcasted by said stationary integrated RT_LT, and detecting said laser beam generated by said stationary integrated RT_LT by using said mobile integrated radio receiver/laser detector (RR_LD); and (D) determining the 3-D position coordinates of said mobile integrated radio receiver/laser detector (RR_LD) based on a set of data selected from the group consisting of: said plurality of received external radio signals; said at least one received internal radio signal; and said at least one detected laser beam.

47. The method of claim 46 further comprising the steps of:

(E) sending back to said stationary integrated RT_LT said 3-D position coordinates measurements of said at least one mobile integrated radio receiver/laser detector (RR_LD); and (F) displaying said 3-D position coordinates measurements of at least one said mobile integrated radio receiver/laser detector (RR_LD), wherein said stationary integrated radio transmitter/laser transmitter (RT_LT) further includes a display block.

48. A method of determining the position coordinates of a mobile user comprising the steps of:

(A) providing a stationary radio transmitter positioned at a first location with known coordinates; providing a stationary laser transmitter positioned at a second location with known coordinates; and providing said mobile user comprising a mobile integrated radio receiver/laser detector (RR_LD);

(B) broadcasting at least one internal radio signal by using said stationary radio transmitter positioned at said first location with known coordinates;

(C) broadcasting at least one laser beam by using said stationary laser transmitter positioned at said second location with known coordinates;

(D) receiving a plurality of external radio signals, receiving at least one said internal radio signal broadcasted by said stationary radio transmitter positioned at said first location with known coordinates; and detecting said laser beam generated by said stationary laser transmitter positioned at said second location with known coordinates by using said mobile integrated radio receiver/laser detector (RR_LD); and (E) determining the 3-D position coordinates of said mobile integrated radio receiver/laser detector (RR_LD) based on a set of data selected from the group consisting of: said plurality of received external radio signals; said at least one received internal radio signal; and said at least one detected laser beam.

49. The method fo claim 48 further comprising the steps of:

(F) sending back to said stationary radio transmitter positioned at said first location with known coordinates and sending back to said stationary laser transmitter positioned at said second location with known coordinates said 3-D position coordinates measurements of said at least one mobile integrated radio receiver/laser detector (RR_LD); and (G) displaying said 3-D position coordinates measurements of at least one said mobile integrated radio receiver/laser detector (RR_LD), wherein said radio transmitter positioned at said first location with known coordinates includes a first display block; and wherein said stationary laser transmitter positioned at said second location with known coordinates includes a second display block.

* * * * *